United States Patent [19]
Cooper et al.

[11] Patent Number: 5,174,877
[45] Date of Patent: Dec. 29, 1992

[54] APPARATUS FOR PHOTOCATALYTIC TREATMENT OF LIQUIDS

[75] Inventors: Gerald Cooper, Boulder; Matthew A. Ratcliff, Lakewood, both of Colo.

[73] Assignee: Photo-Catalytics, Inc., Boulder, Colo.

[21] Appl. No.: 451,375

[22] Filed: Dec. 15, 1989

Related U.S. Application Data

[63] Continuation-in-part of Ser. No. 888,872, Jul. 24, 1986, Pat. No. 4,888,101.

[51] Int. Cl.$^5$ ............................................. C25B 9/00
[52] U.S. Cl. ............................ 204/193; 204/157.15; 204/157.4; 204/157.6; 422/186; 422/186.3
[58] Field of Search ......... 204/157.15.157.4.157.6.193; 422/186.186.3

[56] References Cited

U.S. PATENT DOCUMENTS

| | | | |
|---|---|---|---|
| 4,571,290 | 2/1986 | Ward et al. | 204/157.69 |
| 4,655,891 | 4/1987 | Ward et al. | 204/157.93 |
| 4,861,484 | 8/1989 | Lichtin et al. | 210/694 |

OTHER PUBLICATIONS

Matsunaga et al, "Photoelectrochemical sterilization of microbial cells by semiconductor powders", FEMS Microbiology Letters 29 (1985) p. 211-214.
Carey et al., "The Photochemical Treatment of Wastewater by UV Irradiation of Semiconductor", Water Poll. Res. J. of Canada (1980) 15 No. 2, pp. 157-185.
Solar Energy Research Institute, Nov. 8, 1990, p. 1, "Hal Link's Talk at the Bidder's Conference on Innovative Reactor Subcontract."
Solar Energy Research Institute, pp. 2-5, John V. Anderson, et al., "Development of U.S. Solar Detoxification Technology: An Introduction".
National Renewable Energy Laboratory NREL LabTalk, p. 3, Paula Pitchford, "Solar system cleans up groundwater in California."

Primary Examiner—John Niebling
Assistant Examiner—David G. Ryser
Attorney, Agent, or Firm—Ralph F. Crandell; Carol W. Burton

[57] ABSTRACT

Apparatus for decontaminating a contaminated fluid by using photocatalytic particles. The apparatus includes a reactor tank for holding a slurry of the contaminated fluid and the photocatalytic particles ultraviolet light irradiates the surface of the slurry, thereby activating the photocatalytic properties of the particles. Stirring blades for continuously agitate the irradiated fluid surface maintaining the particles in a suspended state within the fluid. A cross flow filter is used for separating the fluid from the semiconductor powder after the decomposition reaction is ended. The cross flow filter is occasionally back flushed to remove any caked semiconductor powder. The semiconductor powder may be recirculated back to the tank for reuse, or may be stored for future use. A series of reactor tanks may be used to gradually decompose a chemical in the fluid. The fluid may be pretreated to remove certain metal ions which interfere with the photocatalytic process. Such pretreatment may be accomplished by dispersing semiconductor particles within the fluid, which particles adsorb ions or photodeposit the metal as the free metal or its insoluble oxide or hydroxide, and then removing the semiconductor particles together with the adsorbed metal ions/oxides/hydroxide/free metal from the fluid.

38 Claims, 13 Drawing Sheets

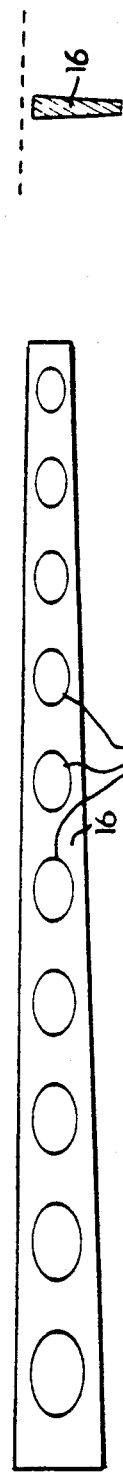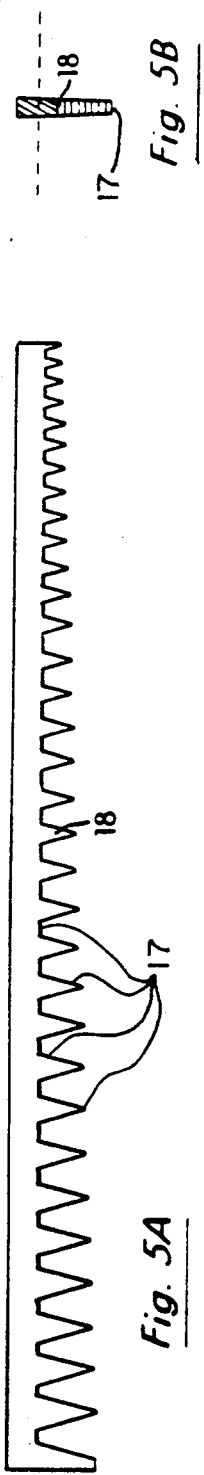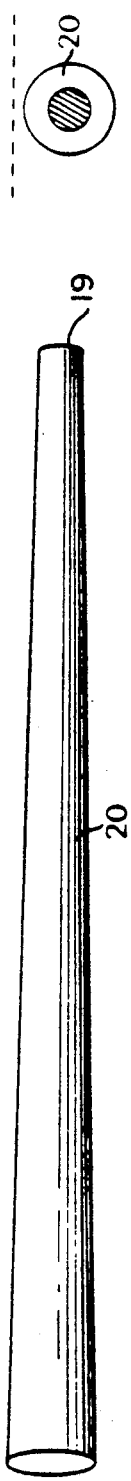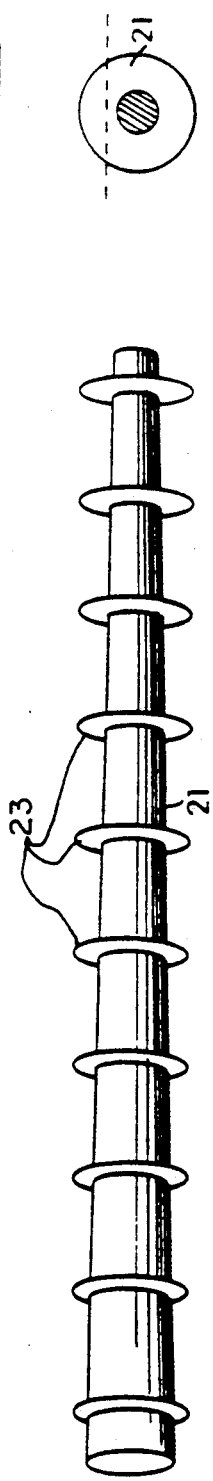

APPARATUS FOR PHOTOCATALYTIC TREATMENT OF LIQUIDS

This invention was made with Government support under Contract NAS-17987, awarded by NASA. The Government has certain rights in this invention.

CROSS REFERENCE TO RELATED APPLICATION

This patent application is a continuation-in-part of co-pending U.S. patent application Ser. No. 888,872, filed Jul. 24, 1986, entitled "System For And Method Of Photocatalytically Modifying A Chemical Composition and Method Of Constructing A Panel Utilized In The System And Method", now U.S. Pat. No. 4,888,101.

BACKGROUND OF THE INVENTION

1. Field of the Invention

The present invention relates to apparatus for use in the photocatalytic treatment of liquids and more particularly to apparatus for and a method of decontaminating a contaminated fluid by utilizing photocatalytic particles.

2. Description of the Prior Art

A relatively new technology uses semiconductor powders to carry out photocatalytic processes. Irradiation of the semiconductor with light of energy equal to or greater than the band gap results in the creation of electrons in the semiconductor conduction band and holes in the valence band followed by trapping of the separated charges in shallow traps at the semiconductor powder surface. The injection of these electrons and holes into the fluid region surrounding the semiconductor particles' surface causes electrochemical modification of substances within this region. Such technology has been used in at least the following photocatalytic processes: the photo-Kolbe reaction in which acetic acid is decomposed to methane and carbon dioxide; the photosynthesis of amino acids from methane-ammonia-water mixtures; the decomposition of adipic acid to carbon dioxide, butane, and valeric acid; the production of hydrogen from several aliphatic and aromatic compounds (including fossil fuels) with water; the degradation of chlorinated hydrocarbons to carbon dioxide and hydrochloric acid; the oxidation of cyanide; the sterilization of aqueous microbial cells; and the deposition of metals from their aqueous ions.

As is well known, catalytic action results when a catalytic agent reduces the activation energy required to drive a chemical reaction to completion. In ordinary heterogeneous catalysis, the activation energy, Ea, is provided by heat and the catalyst reduces the amount of heat required. Hence, the catalyst permits driving the chemical reaction at a faster rate at a given temperature or lowers the temperature at which a given rate occurs. In contrast, in photocatalysis, Ea is provided by the photon energy of the incident band-gap light. Light has a very high free energy content, and it can be converted into high energy electron excitation when absorbed by semiconductors. Thus, optically excited semiconductors can drive chemical reactions even at room temperature by providing Ea in the form of high energy electrons and holes.

Photocatalysis is distinguishable from ordinary heterogeneous catalysis in that it employs visible and ultraviolet (UV) radiation to facilitate chemical reactions rather than thermal energy (i.e., heat). Although the infrared (IR) part of the spectrum is also electromagnetic radiation, its absorption by matter normally results in heating. Absorption of IR radiation will result in the heating of the catalyst or chemical reactants. In ordinary catalysis, thermal energy derived from IR irradiation, direct heating or even microwave absorption manifests itself as an elevated temperature (increased energy of translational, rotational, and vibrational modes) of the chemical reactants and the catalyst for the provision of the reaction's activation energy. The optical properties (i.e., the ability of radiation to effect electronic excitations) of the catalyst are not germane. In ordinary catalysis the catalyst may even be a semiconducting material. However, this is an incidental property, and no particular use of its optical properties is made. The ordinary catalyst is optically passive, and only provides an adsorbing surface for diminishing the activation energy of reactants.

As a result, the role played by IR, visible, and UV light in ordinary catalysis and photocatalysis is fundamentally different. In distinction from ordinary catalysis, in heterogeneous photocatalysis, the catalyst's optical properties are paramount. The photocatalyst must be a semiconductor. By absorption of band-gap light, electron and hole charge carrier pairs are produced within the photocatalyst particles. These charge carriers then perform redox reactions with the chemical species. Ordinary catalytic properties, as described above, may also be a feature of the photocatalytic process. Additionally, ordinary thermal processes may also play a secondary role in reaction kinetics (e.g., absorption of any wavelength light could result in some system heating). However, the distinguishing feature of photocatalytic reactions is that the activation energy of reaction results primarily from optical processes and the subsequent generation and transfer of electron holes (i.e., redox chemistry) rather than simple heating.

Some of the exemplary literature describing experiments utilizing such technology are: "Photocatalytic Reactions of Hydrocarbons and Fossil Fuels with Water. Hydrogen Production and Oxidation", by K. Hashimoto, T. Kawai, and T. Sakata, *J. Phys. Chem.*, Vol. 88, No. 18, pp. 4083-4088, 1984; "Solar Photoassisted Catalytic Decomposition of the Chlorinated Hydrocarbons Trichloroethylene and Trichloromethane", by S. Ahmed and D. Ollis, *Solar Energy*, Vol. 32, No. 5, pp. 597-601, 1984; "Heterogeneous Photocatalytic Decomposition of Benzoic Acid and Adipic Acid on Platinized $TiO_2$", by M. Fujihira, Y. Satoh and T. Osa, *Nature*, Vol. 293, pp. 206-208, 1981; "Powder Layer Photoelectrochemical Structure", by R. E. Hetrick, *J. App. Phys.*, Vol. 58, No. 3, pp. 1397-1399, 1985; "Solar Assisted Oxidation of Toxic Cyanide", Langley Research Center, Hampton, Virginia, *NASA Tech Briefs*, p. 106, Spring 1985; "Photocatalytic Decomposition of Water and Acetic Acid Using a Powder-Layer Photoelectrochemical Structure", by R. E. Hetrick, *App. Phys. Comm.*, Vol. 5, No. 3, pp. 177-187, 1985; "Photoelectrochemical Sterilization of Microbial Cells By Semiconductor Powders", by T. Matsunaga, R. Tomoda, T. Nakajima, and H. Wake, *FEMS Microbiology Letters*, Vol. 29, pp. 211-214, 1985; "Photocatalytic Deposition of Metal Ions Onto $TiO_2$ Powder", by K. Tanaka, K. Harada, and S. Murata, *Solar Energy*, Vol. 36, No. 2, pp. 159-161, 1986.

Photocatalytic processes have also been used to decompose into relatively harmless products, the following chemicals: trichloroethylene, catechol, acetic acid, benzonitrile, phenol, caprolactam, acetone, methanol, urea, dichloromethane, chloroform, carbon tetrachloride, trichloromethane, 4-chlorophenol, pentachlorophenol, polychlorinated biphenyl, dioxins, p-dichlorobenzene, 1,1-dibromoethane, and 1,2-dibromoethane. Photoelectrochemical processes employing irradiated semiconductor slurries have been investigated for the removal of metals by photoeleotrodeposition; for example chromium(VI), copper(II), cadmium, lead, arsenic, and mercury.

It is believed that all present systems utilizing the technology maintain the chemical compounds to be modified in a gas mixture, gas solution, a gas/liquid mixture, a liquid, or another fluid for the most effective contact between the chemical compound and the semiconductor powder. In most of the systems, the semiconductor powder itself is also suspended and mixed in the gas or liquid and is maintained in such suspended and mixed condition by bubbling a gas through a liquid, constantly stirring the fluid with a magnetic stirrer, for example, or continuously circulating the fluid with a pump. A problem with suspending and mixing the semiconductor powder in a gas or liquid is that some means must be utilized to maintain the semiconductor powder in a suspended and mixed condition and that the semiconductor powder must at some time be segregated from the modified chemical compound, especially if the semiconductor powder is to be reused. In another system, the photocatalyst can be immobilized onto a substrate. If the photocatalyst powder particles are small enough, they can be made to effectively adhere to the substrate by relatively weak forces. Another method of immobilization is to cause chemical binding of the photocatalyst to the substrate. Although immobilizing the photocatalyst solves the problem of powder segregation after completion of chemical reactions, the immobilized system can suffer from inefficient light usage due to mass transfer problems or the photocatalyst can be poisoned, thereby necessitating the replacement of the immobilizing matrix. It also appears that the known systems prior to the development of the invention in the co-pending patent application carry out photocatalytic processes on a batch or intermittent basis for modifying relatively small amounts of chemical substances.

One of the major barriers to implementing photocatalytic technology on a commercial scale has been the lack of a technique for the efficient separation of the semiconductor powder from the slurry reaction mixture due to the small size of the particles, which are usually in powder form and of sub-micron diameters. Use of conventional filters to separate the semiconductor powder from the slurry reaction mixture causes the powder to quickly cake over the filter and eventually clog the filter to the point where the filter fails to function. Another technique that has been used to separate the semiconductor powder from the slurry reaction mixture is to centrifuge the slurry, however, this process usually does not effect complete separation, and centrifuge equipment is cumbersome to use and is expensive. Also, the centrifuge process may require that the operation of the photocatalytic process be disrupted in a non-continuous operation. Consequently, in any commercial, large scale, substantially continuous photocatalytic operation in which the semiconductor powders are suspended in the fluid containing the substances to be decomposed, there is a need for an effective and efficient particle separation system that will segregate the semiconductor powder from the fluid after the decomposition has been achieved.

OBJECTS OF THE INVENTION

The principal object of the present invention is to provide an improved apparatus for use in the photocatalytic treatment of liquids.

Another object of the present invention is to provide an improved apparatus for the photocatalytic treatment of liquids which enhances the efficiency of the photocatalytic treatment process.

A further object of the present invention is to provide an apparatus of the foregoing character which is simple in construction, efficient and effective in use and is readily adapted for use with a variety of ultra-violet light sources.

Still a further object of the present invention is to provide an apparatus of the foregoing character which provides for improved agitation of the photocatalytic reaction slurry in order to enhance the efficiency of the reaction.

Still a further object of the present invention is to provide photocatalytic reaction apparatus of the foregoing character utilizing agitating members of improved construction in order to enhance the efficiency of the reaction process.

Other objects and advantages of the present invention will become apparent as the following description proceeds.

SUMMARY OF THE INVENTION

The present invention relates to a system for decontaminating a contaminated fluid by using photocatalytic particles. The system includes a reactor for holding the contaminated fluid with the photocatalytic particles suspended in the contaminated fluid to form a slurry. Light irradiates the surface of the slurry, thereby activating the photocatalytic properties of the particles. The system also includes stirring impellers for continuously agitating the irradiated fluid surface and for maintaining the particles in a suspended state within the fluid. The system also includes a cross flow filter for segregating the fluid (after decomposition) from the semiconductor powder. The cross flow filter is occasionally back flushed to remove any semiconductor powder that might have caked on the filter. The semiconductor powder may be recirculated back to a reactor for reuse, or may be stored for future use. A series of such systems may be used to gradually decompose a chemical in the fluid. Preferably, the fluid is pretreated to remove certain metal ions which interfere with the photocatalytic process. Such pretreatment may be accomplished by dispersing semiconductor particles within the fluid. The particles can either simply adsorb or photoelectrochemically remove the metal ions which are subsequently removed with the particles from the fluid.

A method of decontaminating a contaminated fluid is also disclosed.

BRIEF DESCRIPTION OF THE DRAWINGS

The present invention will be described with reference to the accompanying drawings, wherein:

FIG. 4A is a side schematic view of an impeller that may be used to agitate the surface of the slurry comprised of the contaminated fluid and the photocatalytic particles suspended therein;

FIG. 4B is an end view of the impeller shown in FIG. 4A;

FIG. 5A is a side schematic view of another impeller that may be used to agitate the slurry;

FIG. 5B is an end view of the impeller shown in FIG. 5A;

FIG. 6A is a side schematic view of another impeller that may be used to agitate the slurry surface;

FIG. 6B is an end view of the impeller shown in FIG. 6A;

FIG. 7A is a side schematic view of yet another impeller that may be used to agitate the slurry surface;

FIG. 7B is an end view of the impeller shown in FIG. 7A;

DESCRIPTION OF A PREFERRED EMBODIMENT

Figure 1:
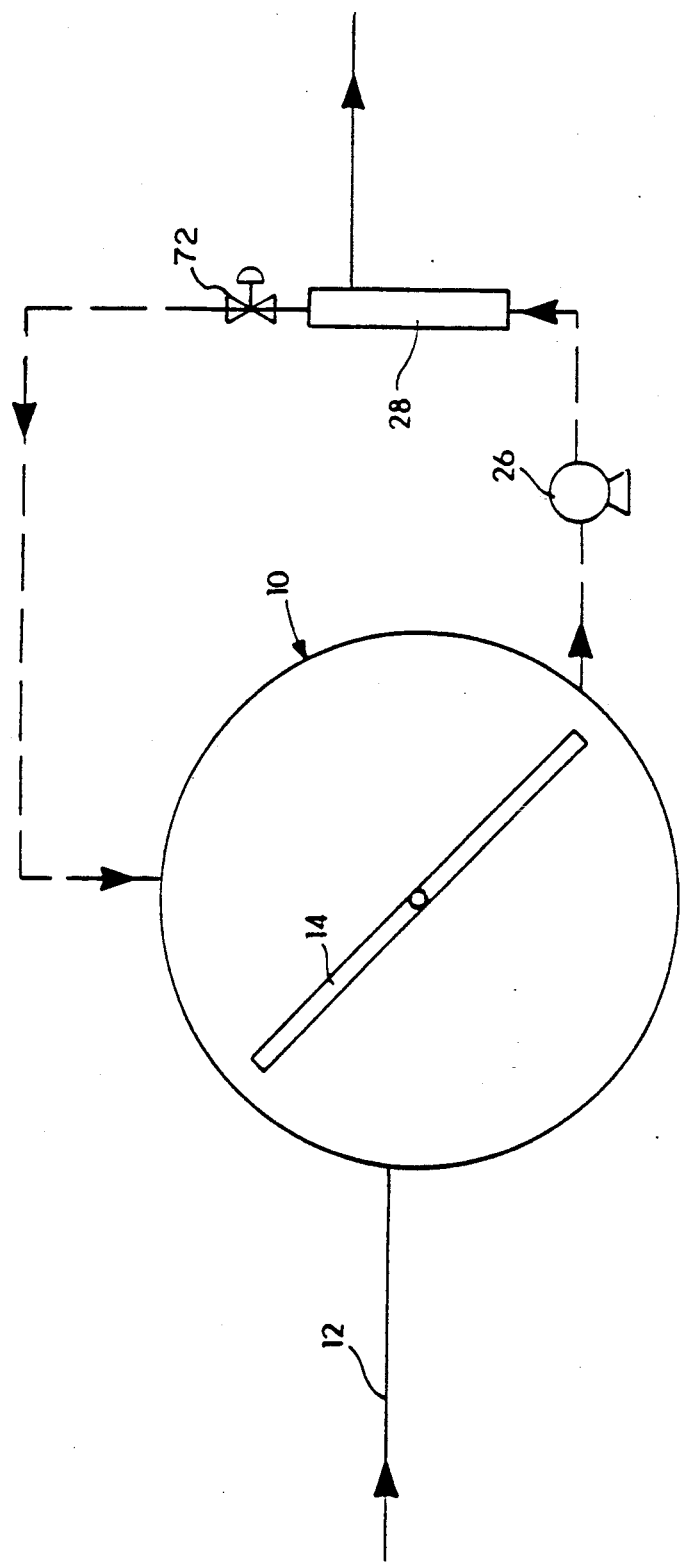
FIG. 1 is a schematic diagram of a single reactor system for decontaminating a contaminated fluid by using photocatalytic powder particles according to one embodiment of the present invention.

There is shown in FIG. 1 a schematic diagram of a single reactor system for decontaminating contaminated fluid by using photocatalytic particles. As used in the present invention, a "contaminated" fluid is a fluid that contains undesirable organic and/or inorganic products and/or possibly microbial cells or other microorganisms. Although the contaminates are undesirable in the sense that they are usually toxic when ingested or contacted by humans, the term "undesirable" should not be understood to be restricted to such toxic substances. The term "decontaminated" fluid means that the undesirable substances in the fluid have been altered or modified into a desireable or an acceptable substance, again, usually a substance that is non-toxic. Normally such alteration or modification of any organic substance is achieved by decomposing the substance into by-products having a smaller molecular weight than the original contaminated substance. Inorganic substances are removed by either adsorption or photodeposition, whereas microorganisms are killed.

The system shown in FIG. 1 includes a cylindrically shaped reactor 10 fashioned of plastic and having a diameter of between about thirty-three inches and seven hundred feet. The reactor 10 possesses a depth or length of about three and one-half inches to approximately one foot or more, depending on reactor diameter, and is open at one longitudinal end thereof. Such a reactor is referred to throughout this specification as a continuously stirred tank reactor (CSTR). The contaminated fluid is introduced into the CSTR 10 via a conduit 12, and then a semiconductor powder such as anatase titanium dioxide is mixed into the contaminated fluid within the CSTR 10. Alternatively, the semiconductor particles may be previously dispersed within the contaminated fluid before introducing the contaminated fluid into the CSTR 10, or the semiconductor powder may be disposed within the CSTR 10 when the contaminated fluid is introduced into the CSTR 10 by an automated catalyst feeder (ACF) as a slurry or as a dry powder.

Figure 2:
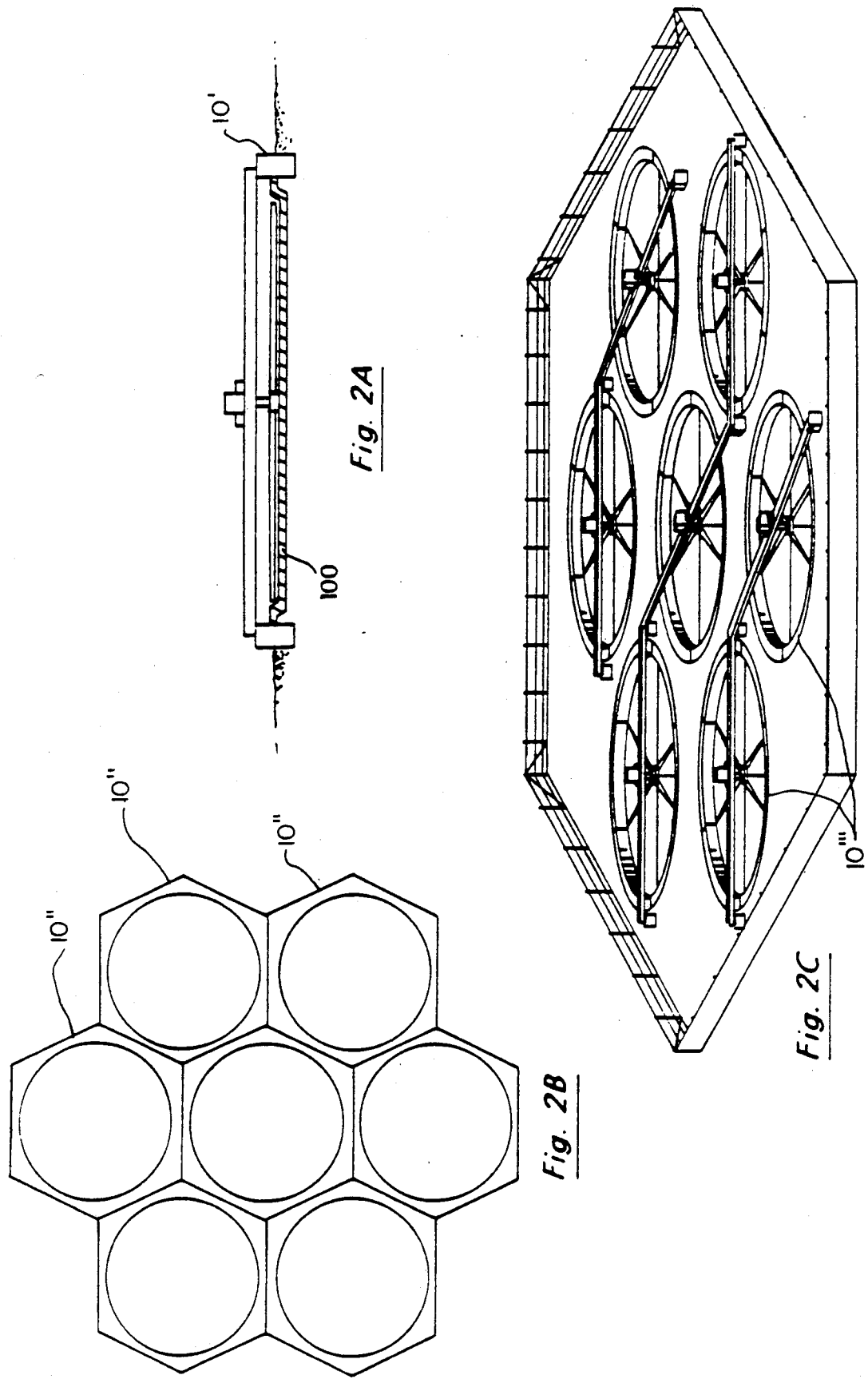
FIG. 2A is a side schematic illustration of a single reactor for decontaminating a contaminated fluid by using photocatalytic powder particles in which the reactor bottom is formed by excavating the ground and employing a flexible liner in accordance with another embodiment of the present invention.
FIG. 2B is a top schematic illustration of seven of the reactors shown in FIG. 2A packed together in a hexagonal array.
FIG. 2C is a perspective illustration of the hexagonal array of reactors shown in FIG. 2B.

As the scale of the CSTR increases, it may be desireable to fabricate the CST from materials other than plastic. In particular, a cost effective method for fabricating a large scale solar driven photocatalytic CSTR 10' may be to excavate a level, shallow, round depression in the ground, then line the soil with an inert polymer liner 100 such as hypalon or other inert material, as shown in FIG. 2A. Conventional materials such as concrete could be used to fabricate CSTRs either above or below the ground. In order to optimize usage of real estate, the round CSTRs 10" and 10"' may be placed on the surface in a hexagonal packed array as shown in FIGS. 2B and 2C respectively.

The open longitudinal end of the CSTR 10 is disposed vertically upward so that the surface of the slurry comprised of the contaminated fluid and the semiconductor particles suspended therein may be illuminated by sunlight or some other light source capable of causing the semiconductor powders to be photocatalytically active. It should be appreciated that in the system, the CSTR 10 may be replaced by reactors having completely different geometries and may be irradiated by various natural and artificial light sources, including the sun, and that the reactors may be completely enclosed and have transparent walls, such that the slurry may be irradiated within the reactor 10 from any one or more of several directions. In the case of some reactors, mixing the fluid by impellers may be impractical due to geometric constraints. In such cases, mixing may be achieved by using a pump to force fluid through the reactor, and the reactor is designed to facilitate suitable slurry mixing by means of the pump.

The photocatalytically active semiconductor powder gradually decontaminates the fluid. The degree of decontamination may be monitored by a suitable detector (not shown) to determine when a desireable degree of decontamination has been achieved within the slurry in the CSTR 10. The rate of decontamination depends upon the types of contaminant, the contaminant concentrations, the relative amounts of contaminated substances within the fluid, the relative amounts of semiconductor powder within the slurry, the magnitude of irradiation having the desired wavelength directed onto the slurry, the slurry pH, and other factors.

The inventors have discovered through experimentation that when light irradiates a slurry surface containing the contaminated fluid and the semiconductor particles, the irradiation causes the semiconductor powders to become photocatalytically active within only one or two millimeters of the slurry surface being irradiated at nominal loadings of about 0.2% by weight.

Incremental amounts of photocatalyst particles were added to a recirculating batch reactor fitted with a low pressure mercury lamp (principal emission at 254 nm) and the light intensity measured via a photoelectrochemical detector. Because the photocatalyst (anatase) is transparent to wavelengths longer than about 380 nm, and because the detector was rutile, a small constant amount of radiation having wavelengths longer than about 380 nm was un-attenuated by the anatase slurry. A correction was made for this transparency characteristic by subtracting a small constant from the raw data. A plot of natural log of fraction of light transmitted vs photocatalyst loading yielded a straight line. Thus the transmission, T, of the photocatalyst slurry can be described by the familiar expression:

$$T = I/Io = \exp(-A*X*C) \quad (1)$$

The slope of this line is equal to $A*X$, where A is the absorption coefficient, X is the absorption thickness in cm, and C is the photocatalyst concentration in weight percent. For a titanium dioxide photocatalyst employed, a value of A equal to 48.8 cm$^{-1}$ wt %$^{-1}$ was obtained. Table 1 below is the calculated fraction of light transmitted, I/Io, vs absorption thickness using the experimentally determined value of A in equation (1) for a photocatalyst loading of 0.2 wt % (nominal minimal loading for maximal efficiency). The important point is that of the incident light, 38% and 14% is transmitted, or 62% and 86% is absorbed within the first 0.1 and 0.2 cm, respectively. This thin illuminated region is the photoactive region. Fluid beyond this region is essentially in the dark, and little or no photocatalytic reactions occurs there.

TABLE 1

Fraction of 254 nm light transmitted through various photocatalyst slurry depths, X, at 0.2 wt % loading, C, for A equal to 48.8 cm$^{-1}$ wt %$^{-1}$.

| X (cm) | T = exp(−A*X*C) |
|---|---|
| 0.00 | 1 |
| 0.05 | 0.614 |
| 0.1 | 0.377 |
| 0.15 | 0.232 |
| 0.20 | 0.142 |
| 0.25 | 0.087 |

Thus, for example, if the slurry is about two inches deep within the CSTR 10, and the top surface of the slurry is irradiated with 254 nm light, it is seen from Table 1 above that only the top one or two millimeters of the slurry is photocatalytically active, and therefore the photocatalytic particles are decontaminating the contaminated fluid effectively only in that very thin upper region of the slurry.

It should be mentioned that for longer wavelength radiation, such as solar radiation (300 to 400 nm), the penetration depth may be slightly greater owing to scattering dependence on wavelength and weaker attenuation of longer wavelength light by the photocatalyst.

Figure 3:
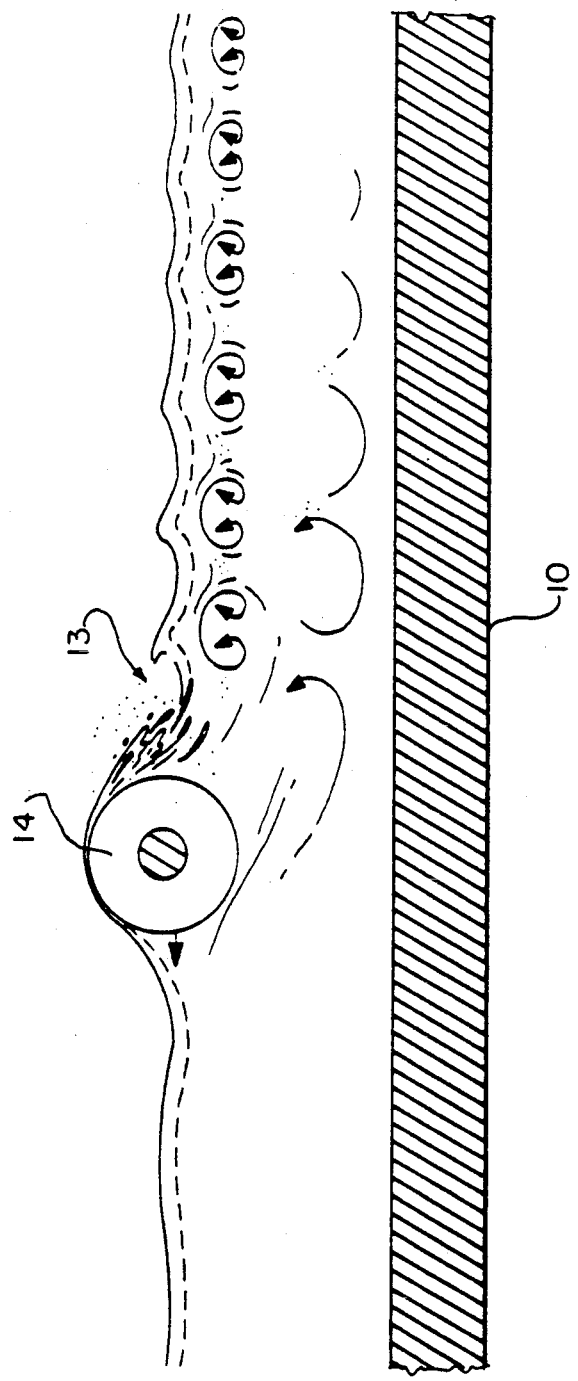
FIG. 3 is a cross sectional illustration showing the air/water interface within a reactor and the surface turbulence generated by an impeller used in the reactors in accordance with the present invention.

The photocatalytic activity can take place very quickly in the one to two millimeter illuminated region, and therefore, it is desireable that portions of the slurry containing contaminated fluid be quickly moved into the one to two millimeter region of the upper surface of the slurry in order to achieve relatively quick and efficient decontamination of the fluid. This movement is accomplished by the generation of surface turbulence 13 as shown in FIG. 3.

The inventors have constructed a pair of impellers oriented 180 degrees apart and rotatable about an axle oriented in substantially alignment with the longitudinal axis of the CSTR 10. Each impeller, which was fashioned out of 0.25 inch thick plastic and stepped down so that a smaller cross sectional area was presented to the fluid in a direction radially away from the axis of rotation, was rotated by a motor at a rate of angular speed approaching that which would quickly replenish the upper one to two millimeters of slurry surface with the contaminated fluid (shown in FIG. 3 as surface turbulence 13). It was found that upon approaching the revolution rate which causes adequate mixing, the impeller within the reactor 10 caused the undesirable effect of transferring significant amounts of angular momentum to the slurry (i.e., the impeller caused the slurry to circulate in the direction of rotation of the impeller). This resulted in the displacement of large amounts of slurry from near the center of rotation to the periphery of the CSTR 10 due to centrifugal forces (vortex formation). Also, a relatively great amount of energy is consumed due to the viscous drag on the rotating fluid caused by the walls of the reactor 10.

TABLE 2

Compilation of quantum yields of various reactors in photocatalytically decomposing TCE and red food dye as the test organics.

| TEST NO. | REACTOR TYPE | REACTOR VOLUME (LITERS) | QUANTUM YIELD |
|---|---|---|---|
| COMPILATION OF PHOTOCATALYTIC DECOMPOSITION OF TCE DATA IN VARIOUS REACTORS | | | |
| 1 | Front Illuminated | 0.86 | 0.253 |
| 2 | Front Illuminated | 0.85 | 0.263 |
| 3 | Front Illuminated | 0.89 | 0.452 |
| 4 | Front Illuminated | 0.89 | 0.335 |
| 5 | Front Illuminated | 0.89 | 0.196 |
| 6 | Annular (Cyclonic) | 0.79 | 0.060 |
| 7 | Annular (35 mm) | 0.7 | 0.095 |
| 8 | Annular (35 mm) | 0.7 | 0.130 |
| 9 | Annular (38 mm) | 0.845 | 0.112 |
| 10 | Annular (38 mm) | 0.845 | 0.123 |
| 11 | Hemi./Jet | 0.57 | 0.094 |
| 12 | CSTR 45 RPM | 16 | 0.148 |
| 13 | Annular (35 mm) | 0.7 | 0.157 |
| 14 | Annular (35 mm) | 0.7 | 0.124 |
| 15 | Annular (38 mm) | 0.85 | 0.140 |
| COMPILATION OF PHOTOCATALYTIC DECOMPOSITION OF RED DYE DATA IN VARIOUS REACTORS | | | |
| 16 | Annular (Cyclonic) | 0.79 | 0.188 |
| 17 | Front Illuminated | 0.89 | 1.105 |
| 18 | Front Illuminated | 0.89 | 0.905 |
| 19 | CSTR | 16 | 0.900 |

The inventors have designed several impellers that achieve the objectives of agitating the fluid surface to replenish the fluid surface with contaminated fluid, to maintain the semiconductor powder in a suspended state substantially uniformly throughout the fluid, to minimize the centrifugal effect on the slurry, and also to aerate the slurry (depicted as the water wake in FIG. 3).

In order to alleviate the above problems, in another experiment a thirty-three inch internal diameter CSTR fitted with twenty-nine inches of 0.125 inch flexible nylon rod as the impeller utilized solar light to photocatalytically decompose TCE. This impeller presented a very small surface area to the slurry and could be operated very near to the slurry surface in order to achieve the greatest disturbance there. TCE was chosen as a model compound because its very fast decomposition kinetics pose a challenge to proper reactor design through avoidance of mass transport limitation. Red food dye was also employed as an indicator of reactor kinetics. However, red food dye exhibits slower kinetics for the same concentration as TCE in parts per million. The data in Table 2 illustrates the non-triviality of proper reactor design. Quantum yield (Q.Y.), in this case, measures a reactor's ability to utilize incident radiation to decompose aqueous organic contaminants. Q.Y.s for initial reaction rates were defined as the ratio of the number of TCE molecules decomposed per second to the number of band-gap photons entering the reactor per second. Note that for experiments that employed red food dye the Q.Y.s are larger than those which used TCE. These Q.Y.s are not directly comparable with those employing TCE but are internally consistent.

In a literature study of the decomposition of chloroform (which has kinetics almost identical to TCE according to R. W. Matthews. J. Catal., 111, 264 (1988)) in an annular reactor, a Q.Y. of 0.036 was obtained by A. L. Pruden and D. F. Ollis, Environ. Sci. Technol., 17, 628 (1983). This reactor type, excluding designs by the inventors, represents state-of-the-art design as reported in the literature. The inventors have made many innovations in reactor design to increase reactor Q.Y. above 0.036, as evidenced in Table 2. Highest Q.Y. was obtained in a recirculating front illuminated reactor (Table 2., tests numbers 1-5). However, this reactor is an impractical configuration for scale-up. In the case of TCE, the CSTR (Table 2., test number 12) has exhibited the next highest Q.Y.s, which are similar to those for the best annular case of the decomposition of red food dye in the front-illuminated reactor, Q.Y.s of about 1 (Table 2., tests numbers 17-18) were obtained under solar and artificial lighting. For the CSTR a Q.Y. of 0.90 (Table 2., test number 19) was obtained. This demonstrates that the CSTR is approaching the efficiency of the highly efficient front-illuminated reactor and a factor of about 5 increase in efficiency over the cyclonic annular reactor (Table 2., test number 16). The salient point here is that the CSTR described above exhibits Q.Y.s far in excess of that described in the literature to date and that, in distinction from the highly efficient but impractical front-illuminated reactor, it is a practical configuration for scale-up. Table 2 also lists the volumes of water treated by the various batch reactors. For the all the various annular reactors described and the front-illuminated reactor, a centrifugal pump powered by a 1/25 horse power electric motor was the primary source of mixing. All these reactors had fluid volumes of less than a liter. The CSTR, which had a 16 liter capacity, was stirred by a 1/25 horse power gear reduction motor. There was sufficient power for the motor to drive at least two similar CSTR reactors for a combined volume of 32 liters. Thus the CSTR is more efficient in its use of electrical power for mixing than the other reactors in Table 2 by about 3200%.

In yet another experiment, a twenty inch long tapered impeller made of fiberglass which had cross sectional diameters of 0.22 and 0.010 inches near the center of rotation and at the distal end, respectively, was employed to mix a 42.5 inch diameter CSTR at approximately 60 RPM. In this type of operation (hereinafter referenced to as operation A) good surface boundary layer mixing was evident by the appearance of surface eddys and wavelets. High relative velocity between the impeller and the water was evidenced by the formation of a fluid envelope wake in the trailing edge of the impeller. Centrifugation of the fluid was also minimized. This demonstrates that most of the mechanical energy imparted to the fluid by the impeller was used for surface agitation and not the wasteful bulk rotation of the fluid. Q.Y.s were not measured.

In yet another experiment, the fiberglass impeller described above was fashioned into a comb by epoxying 0.030 inch diameter wire at a ninety degree angle to the impeller at approximately 0.25 inch intervals. This modified impeller was operated first with both the fiberglass and the comb wires below the surface (hereinafter referred to as operation B) and also by elevating the impeller so that only the wires were submersed (hereinafter referred to as operation C). In operation B, the wires had the effect of breaking up the trailing edge air envelope and achieving better aeration of the fluid. In operation C, much higher revolution rates were achievable than in operations A or B with excellent surface mixing and with less centrifugation of the fluid evident than in operations A or B. Q.Y.s have not yet been measured for these operations. Although FIG. 1 schematically shows a pair of impellers disposed 180 degrees apart disposed within the CSTR and rotated about an axle aligned with the longitudinal axis of the CSTR 10, it should be appreciated that any number of impellers 14 could be advantageously used. Generally, the larger the diameter of the reactor the greater the number of impellers 14 needed for mixing. Each impeller 14 possesses an inner end located at the center of rotation, and an outer or distal end spaced slightly from the peripheral wall of the CSTR 10. Preferably the outer end of the impeller 14 extends about 99% of the radial distance between the center of rotation of the peripheral wall of the CSTR 10.

Preferably, the impeller 14 is positioned essentially so that the impeller 14 only skims or is slightly submerged beneath the slurry surface and is oriented substantially parallel to the slurry surface. The impeller 14 may be rigid and may have a tapered thickness when viewed in the direction of rotation.

Several embodiments of the impeller 14 are shown in FIGS. 4 through 13. There is shown in FIGS. 4A and 4B an impeller 16 having a substantially uniform thickness from the inner end to the outer end thereof. The impeller 16 possesses a series of apertures 15 along its length, each aperture being substantially parallel to the direction of rotation of the impeller 16. The apertures 15 are designed to permit certain portions of the upper slurry surface to pass therethrough and to create vortices and turbulence 13 in the upper region of the slurry surface. Such turbulence 13 permits circulation of slurry in the upper surface region, whereby contaminated fluid is circulated into the upper slurry surface region. The size of the apertures 15 or the numbers of apertures may gradually vary from the inner end to the outer end of the impeller 16 to take into account the greater linear speed at which the outer end of the impeller 16 is being rotated.

There is shown in FIGS. 5A and 5B an impeller 18 in all respects similar to the impeller 16, except that there are no apertures in the impeller 18 and the lower edge 17 of the impeller 18 is serrated, (i.e., fashioned in a "saw tooth" configuration). Again, the lower edge 17 of the impeller 18 is designed to agitate the upper surface of the slurry to create turbulence therein.

There is shown in FIGS. 6A and 6B a tapered or conical rod shaped impeller 20, with the outer end 19 having the smaller diameter. Again, such tapering takes into account the greater speed of the outer end 19 of the impeller 20.

FIGS. 7A and 7B disclose a tapered rod type impeller 21 possessing a series of discs 23 spaced along the impeller length. Each disc 23 lies in a plane substantially perpendicular to the longitudinal axis of the impeller 21. The purpose of the "washer" type discs 23 is to break up the film of water attached to the trailing edge of the impeller 21, thus assisting the aeration and mixing of the slurry.

Figure 8B:
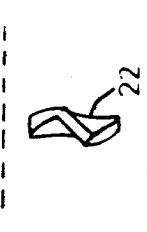
FIG. 8B is an end view of the impeller shown in FIG. 8A.
Figure 8A:
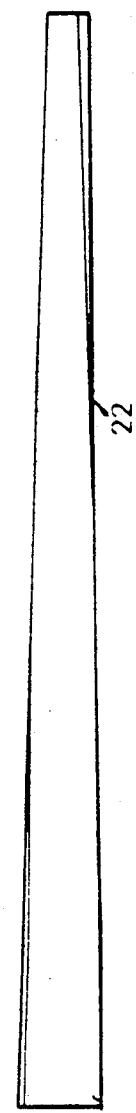
FIG. 8A is a side schematic view of another impeller that may be used to agitate the slurry surface.

There is shown in FIGS. 8A and 8B an impeller 22 having a rectangular cross section that is gradually twisted 90 degrees from the inner end to the outer end thereof. Thus, the effective thickness of the impeller 22, when viewed in the direction of rotation, gradually tapers from a relatively great thickness at the inner end thereof to a relatively thin thickness at the outer end thereof.

Figure 9B:
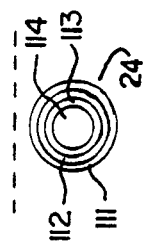
FIG. 9B is an end view of the impeller shown in FIG. 9A.
Figure 9A:
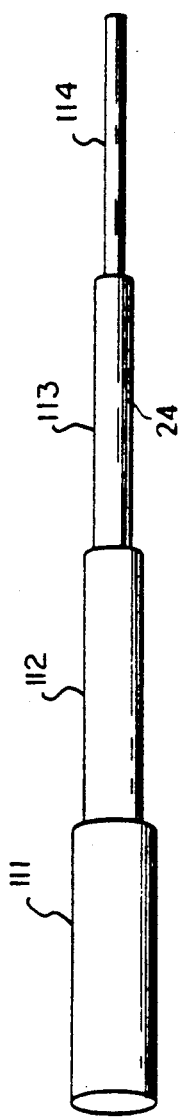
FIG. 9A is a side schematic view of another impeller that may be used to agitate the slurry surface.

There is shown in FIGS. 9A and 9B a telescopic, tapering rod 111, 112, 113, and 114 arranged in such a way that segment 111 has a diameter greater than that of segment 112, segment 112 has a diameter greater than that of segment 113, and segment 113 has a diameter greater than that of segment 114, segment 114 being the cylindrical segment constituting the outer end of impeller 24.

Figure 10B:
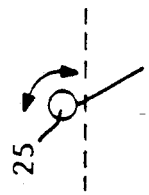
FIG. 10B is an end view of the impeller shown in FIG. 10A.
Figure 10A:
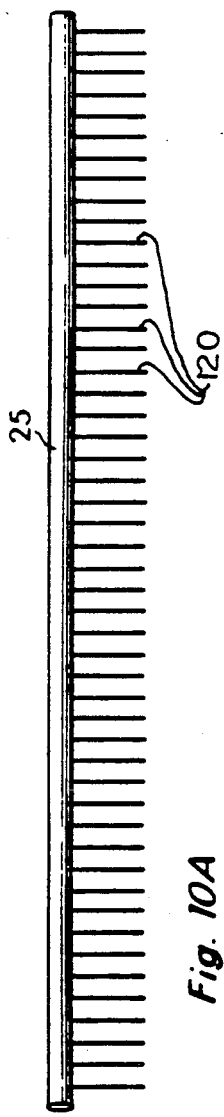
FIG. 10A is a side schematic view of another impeller that may be used to agitate the slurry surface.

FIGS. 10A and 10B disclose a comb type impeller 25 utilized in operations A and B described above. As best shown in FIG. 10B the teeth 120 of the comb like impeller 25 may be either vertically oriented or may be selectively, adjustably inclined.

Figure 11:
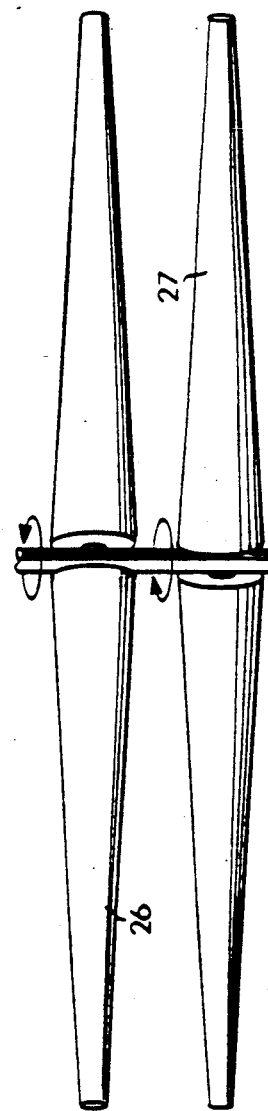
FIG. 11 is a side schematic view a two impeller system that may be used to agitate the slurry surface and the reactor bottom, preferably with the upper impeller rotating in a direction opposite to the rotational direction of the lower impeller.
Figure 12:
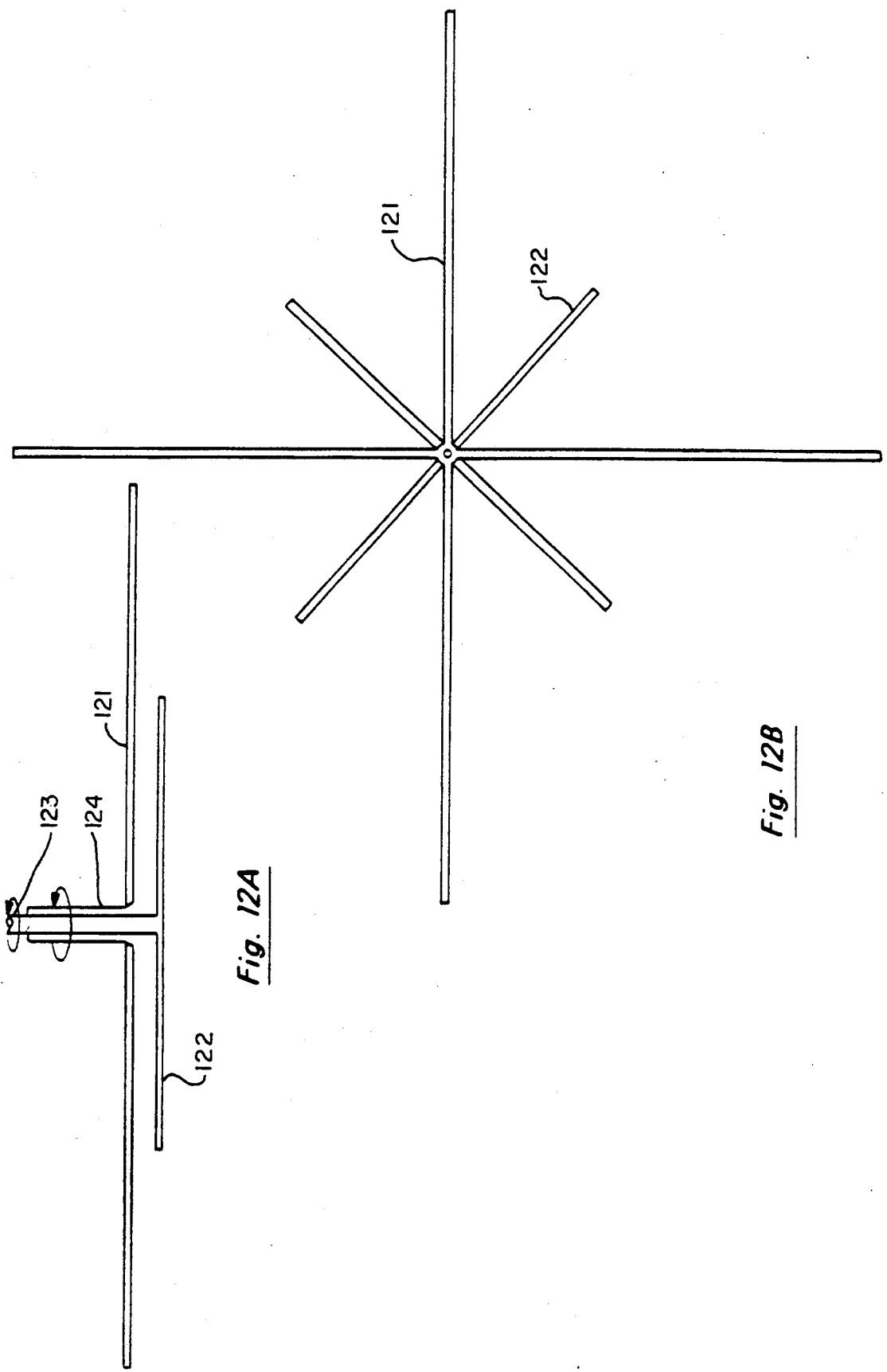
FIG. 12A is a side schematic view of a two impeller system that may be used to agitate the slurry surface and the reactor bottom, preferably with the impeller having radially shorter blades rotating faster than the other impeller.
FIG. 12B is a top schematic view of the two impeller system shown in FIG. 12A.

FIG. 11 shows a pair of vertically spaced impellers 26 and 27 disposed within a CSTR. Preferably one impeller 26 rotates in a direction opposite to the rotational direction of the other impeller 27. The lower impeller 27 helps mix the slurry and maintains the photocatalytic particles in suspension.

Ideally, the effective thickness of the impellers, as viewed in the direction of rotation, decreases away from the center of rotation. Basically, the frontal area presented to the slurry by the impeller should decrease in the direction moving away from the center of rotation. Also, depending upon the configuration of the impeller being used, the impeller should depend preferably a distance in the range of between one millimeter to five millimeters below the surface of the slurry. The impeller may be fashioned of rigid material. Three preferred materials for fashioning the impeller are stainless steel, fiberglass and carbon fiber. Depending upon the relative amount of contamination, the amount of photocatalytic particles, the degree of decontamination, etc., the slurry surface should be swept by an impeller in approximately a half of a second or at least frequently enough to preclude significant dampening of the surface disturbance.

There is shown in FIGS. 12A and 12B a two impeller system comprising an upper impeller 121 and a lower impeller 122, each possessing four blades oriented at ninety degree angles. The lower impeller 122 has blades extending a relatively short radial distance, whereas the upper impeller 121 has blades extending a relatively great radial distance. The lower impeller 122 is mounted on an axle 123 mounted concentrically within a hollow axle 124 upon which the upper impeller 121 is mounted. The axles 123 & 124 are independently rotated, with the lower impeller 122, having the shorter radial blades, being rotated faster than the upper impeller 121. The two impeller system shown in FIGS. 12A and 12B helps insure that the slurry is suitably mixed (especially by the lower impeller 22) near the center of the CSTR. The two impeller system is most advantageously used where the diameter of the CSTR is relatively large.

Figure 13:
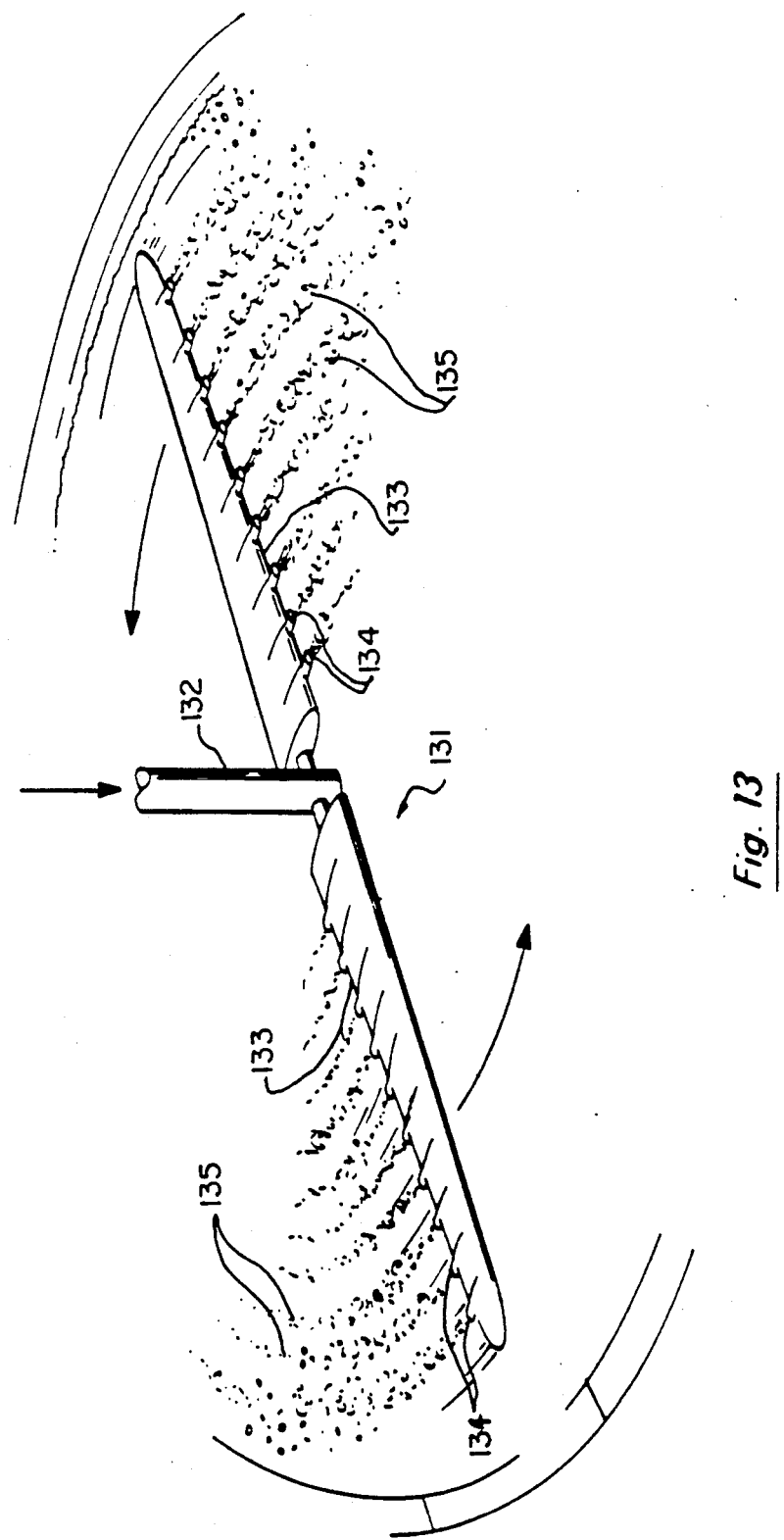
FIG. 13 is a partial perspective view of an air driven impeller disposed near the bottom of the reactor.

Another impeller design is shown in FIG. 13 and utilizes compressed air or oxygen both to cause the impeller 131 to rotate and to aerate or oxygenate the slurry. In this design, the impeller 131 is positioned very near the bottom of the CSTR and presents a relatively narrow cross-section in the direction of rotation in order to minimize momentum transfer to the slurry. The impeller is essentially hollow or contains piping that is in fluid communication with a hollow axle 132 through which the air or oxygen is transmitted. The trailing edges 133 of the impeller 131 are provided with orifices 134 in communication with the hollow impeller interior or the piping within the impeller interior. The release of compressed air or oxygen from the orifices 134 provides a jet propulsion for effecting the rotation of the impeller 131. The released air or oxygen also forms bubbles 135 rising to the slurry surface, which causes slurry surface agitation and also assists in maintaining the suspension of photocatalytic powder within the slurry.

It should also be appreciated from the foregoing that ideally, the slurry within the CSTR 10 possesses a relatively large area and a relatively small depth. This is so minimal energy is wasted unnecessarily mixing large volumes of slurry in the dark regions and so that thorough decontamination of the fluid may be relatively quickly achieved. The depth of the slurry is preferably between one inch and ten inches, depending on the diameter of the CSTR, and the ratio of the area of the fluid slurry surface to the volume of the slurry is in the range of between substantially one/twelve inches to one/one inches.

It should be further appreciated that the agitation and turbulence in the top surface of the slurry helps to maintain the semiconductor particles suspended substantially uniformly throughout the slurry, since the upper surface will be gradually transmitted through convection to the other regions of the slurry, and also helps to aerate the slurry. Aeration is important because oxygen is a primary reactant that effects the degradation of the organics.

Figure 14:
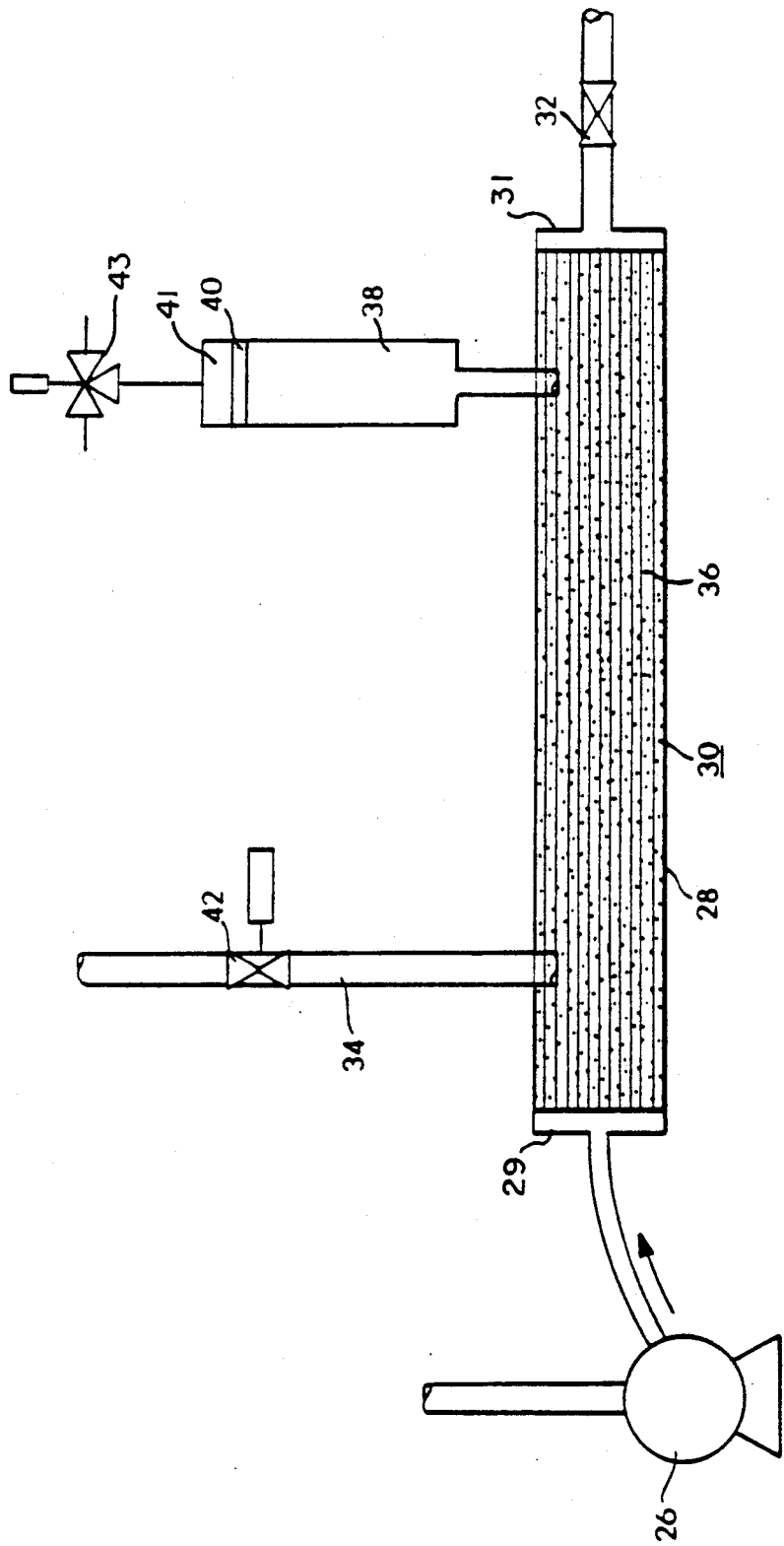
FIG. 14 is a schematic diagram of a centrifugal pump and cross flow filter used to segregate the photocatalytic powder particles from the decontaminated fluid.

When a monitor (not shown) determines the degree of decontamination of the fluid has reached a desireable level, then the slurry is removed from the CSTR and is pumped by a centrifugal pump 26 to a cross flow filter 28 (See FIGS. 1 and 14), which separates and segregates the semiconductor particles from the decontaminated fluid (permeate). The cross flow filter 28 is configured analogous to a tube-in-shell heat exchanger except that the tubes 30 are constructed of a microporous polymer material, the pores 36 of which are perpendicular to the flow of the slurry. The cross flow filter 28 possesses an inlet end 29 into which the pump 26 directs the slurry into the interior of the tubes 30 and an outlet end 31 which returns the slurry as a retentate having a relatively larger amount of semiconductor powder in a relatively smaller amount of decontaminated fluid. A ball valve 32 disposed at the outlet end 31 of the filter 28 restricts the flow of slurry therethrough, which in turn creates a back pressure within the tubes 30. An exit port 3 communicates with the interior of the filter 28 but external to the tubes 30, adjacent the inlet end of filter 28. Since the pressure within the exit port 34 is less than the pressure within the tubes 30, the liquid tends to flow through the pores 36 of the tubes 30 and into the exit port 34. Because the semiconductor powder particles are too large to pass through the pores 36, substantially only the decontaminated fluid passes through the pores 36 and into the exit port 34. The semiconductor powder particles tend to cake on and clog the pores 36 at the inner face within the tubes 30 in a relatively short period of time, thereby rendering the filter 28 ineffective. In accordance with the present invention, the filter 28 is back flushed so as to dislodge the semiconductor powder particles therefrom. Such a back flushing procedure has been used outside the field of the present invention. A cylinder 38 is in fluid communication with the interior of the filter 28 but external to the tubes 30, near the outlet end 31 of filter 28. A piston 40 is slideably disposed within the cylinder 38. The end of the cylinder 38 not in 41 communication with the interior of the filter 28 is in communication with a three-way valve 43. The valve 43 may be positioned so as to cause a source of compressed gas to communicate with the interior of the cylinder 38 and to slide the piston 40 within the cylinder 38 against the pressure of the permeate fluid within the cylinder 38. Alternatively, the three-way valve 43 may be positioned so as to permit the compressed gas within the cylinder 38 to vent to the atmosphere. The back flush mechanism also includes a valve 42 that may open and close the fluid flow within the exit port 34.

The filter 28 may be back flushed in accordance with the following operation. The valve 42 is closed, and then the three-way valve 43 is positioned so that compressed gas acts upon the piston 40 to force the permeate fluid within the cylinder 38 back through the pores 36 within tubes 30. Because of the relatively lower pressure within tube 30, such movement of the piston 40 will cause a pressure pulse to be sharply transmitted through the pores 36 within tubes 30, in the reverse direction, which in turn tends to dislodge the semiconductor powder particles from the pores 36. After the pulse, the valve 42 is opened and the three-way valve 43 is positioned in a vent mode, which allows the cylinder 38 to refill with the permeate fluid. It should be appreciated that a series of pulses may be generated within a short period of time such as a few seconds. Also, the pulsing may be selectively activated or may be controlled by a computer or the like to occur at selected intervals.

The decontaminated fluid drains from the exit port 34, whereas the slurry, now having a relatively high concentration of semiconductor particles, may be recirculated back to the CSTR 10, as shown in FIG. 1, or may be stored. If the slurry is recirculated to the CSTR 10, then such slurry is mixed with new contaminated fluid, and the process is repeated in a substantially continuous operation.

The inventors had noticed anomalously slow decontamination of certain contaminated fluids that they tried to decontaminate using photocatalytic processes similar to those described above. In one anomalous trial the decomposition of aqueous TCE in deionized water (DI) was compared with its decomposition in ground waters taken from three different sampling wells, and it was noted that the decomposition of TCE in all the ground waters was slower than in the DI water. However the decomposition of TCE in one of the waters was particularly slow. Analysis of the ground waters revealed that there were relatively high concentrations (about 2–3 milligrams per liter) of chromium(VI), which later was discovered as having caused the decreased photocatalytic activity. (One of the inventors has shown that cations from metals in group IA and IIA in the periodic table such as sodium, potassium, magnesium, etc. and anions such as sulfate, carbonate, chloride and others do not significantly affect photocatalytic reaction rates, G. COOPER and A. J. NOZIK, final report to the Environmental Protection Agency, IAG NO. DW89931800-01-1, "Novel And Simple Approach To Elimination Of Dilute Toxic Wastes Based On Photoelectrochemical Systems" (1987)). In other experiments, the photocatalyst was used to decompose 100 PPM TCE in waters, separated from the contaminated fluid that was photocatalytically purified, washed several times with pure water, and then reused to purify identical waters. In one of the waters, the photocatalyst could be successfully recycled four times without significant loss of activity. However, for another water, which exhibited the anomaly, almost complete loss of photocatalytic activity occurred after the first use. Atomic absorption analysis of the photocatalyst from the other water indicated almost quantitative recovery of chromium from the particles' surfaces. This was the first reported demonstration of the photocatalytic removal of chromium(VI) from water and its inhibiting effect on the decomposition of aqueous organics. A copy of the results of these anomalous tests are being submitted with the patent application and form part of the file wrapper.

Other metallic ions so far discovered by the inventors that inhibit the photocatalytic decomposition of organics when present in solution at relatively low concentrations on the order of a few milligrams per liter and less, besides chromium(VI), are chromium(III), lead(II), and copper(II). The rate inhibiting effect of these metal ions, at concentrations of 1 and 10 PPM concentrations, on the decomposition of TCE is shown in several graphs submitted with the present application to form part of the file wrapper.

In order to demonstrate that the inhibition of the photocatalytic decomposition of organics by the above metal ions, when present in solution, was universal and not just limited to the decomposition of TCE, the decomposition of aqueous benzene, toluene, xylene and phenol mixture at 50 PPM total organic carbon concentration was investigated in the presence of the above metal ions at 10 PPM concentration. Significant diminishment in photocatalytic activity was caused by the presence of chromium(III), chromium(VI) and lead(II). Copper(II), iron(II) and cadmium(II) caused a slight decrease in decomposition rates. Mercury(II) did not affect reaction rates.

The inventors have reason to believe in some cases that these ions cling to and are adsorbed by the semiconductor particles, thereby rendering the semiconductor powders ineffective for photocatalysis. In other cases the free metals may be photodeposited from the ions by photoelectrochemical reduction onto the particles+ surfaces. In other cases the metal oxide (or hydroxide) may be photodeposited by reductive or oxidative processes onto the photocatalyst particles' surfaces. And in yet other cases, the metal ions or their oxides or hydroxides may act as a reductant and next as an oxidant, thereby effectively causing the recombination of the photogenerated charge carriers and their wastage into heat. Additionally, besides significantly diminishing the rate of organic decomposition, the deposited metal ions/metals/oxides/hydroxides can also poison the photocatalyst thereby making the photocatalyst ineffective for repeated photocatalytic destruction of organics. In catalytic technology, all the above postulated mechanisms of rate decrease due to the presence of a rate inhibiting contaminant is considered "poisoning". Thus, the inventors believe that in order to achieve relatively rapid decontamination from organics of fluids containing such metal ions and to avoid premature photocatalyst poisoning, the deleterious metal ions should first be removed from the contaminated fluid before the fluid is subjected to photocatalytic decontamination from organics. Although such ions might be removed in a host of different ways, including but not limited to ion-exchange resins, activated carbon and electrolysis, and although these techniques might be employed in conjunction with the present photocatalytic invention, the present invention contemplates that the contaminated fluid including the metal ions is first formed as part of a slurry or immobilized structure with semiconductor powder particles, which function not as a photocatalyst for effecting the oxidation of aqueous organics or microorganisms, but as particles to remove the metal ions. In the case of the slurry, it can then be filtered in the same manner as described above, and the semiconductor particles are then stored or recycled for further metal ion removal. In order to demonstrate the rate enhancement of organic oxidation obtained by photocatalytically pretreating metal ion contaminated waters, the water referenced above, containing chromium(VI), was first passed through a UV irradiated module that contained immobilized photocatalyst. After this pretreatment, the water was spiked with TCE and the aqueous TCE was subsequently photocatalytically decomposed. Yet another graph submitted with the patent application and forming part of the file wrapper shows that the decomposition of TCE is faster in the pretreated water than in the unpretreated water. More experiments by the inventors have shown that although the metals contaminated photocatalyst may be inactivated for further organic destruction, its activity for further metal ion removal has not been significantly impaired. Thus, in a practical system, photocatalyst which will inevitably lose its activity as a result of trace metal deposition, even with metal ion pretreatment, can be recycled for use in the metal ion removal pretreatment step. Also, even after the photocatalyst has been sufficiently loaded with metals to render it completely useless for metal removal, the inventors have shown that it may be recycled by treatment with acid solutions such as nitric or nitric/hydrochloric acids. These acid treatments dissolve the deposited metal ions/metals/metal oxides/metal hydroxides, thus regenerating the photocatalyst. The contaminated fluid (absent of the metal ions) is then treated according to the photocatalytic process previously described above.

Figure 15:
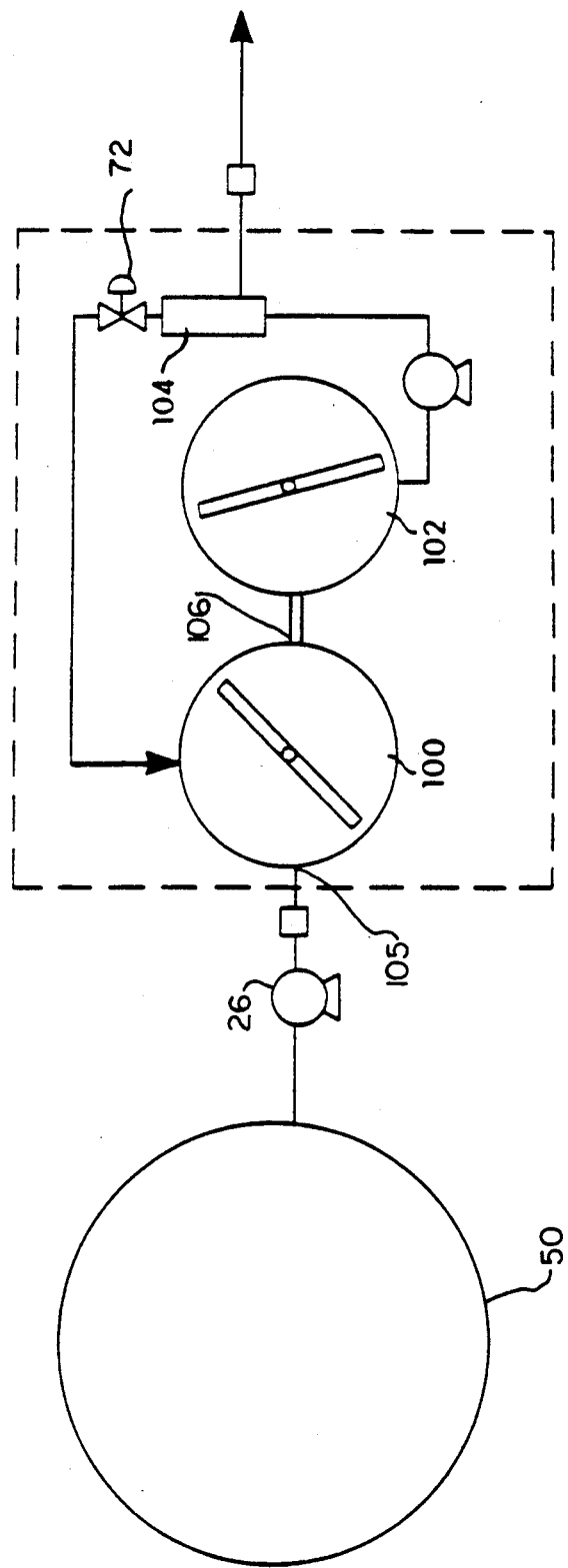
FIG. 15 is a top schematic view of a continuously stirred tank reactor and a cross flow filter for decontaminating a contaminated fluid by utilizing photocatalytic powder particles in a co-current mode according to an embodiment of the present invention.
Figure 16:
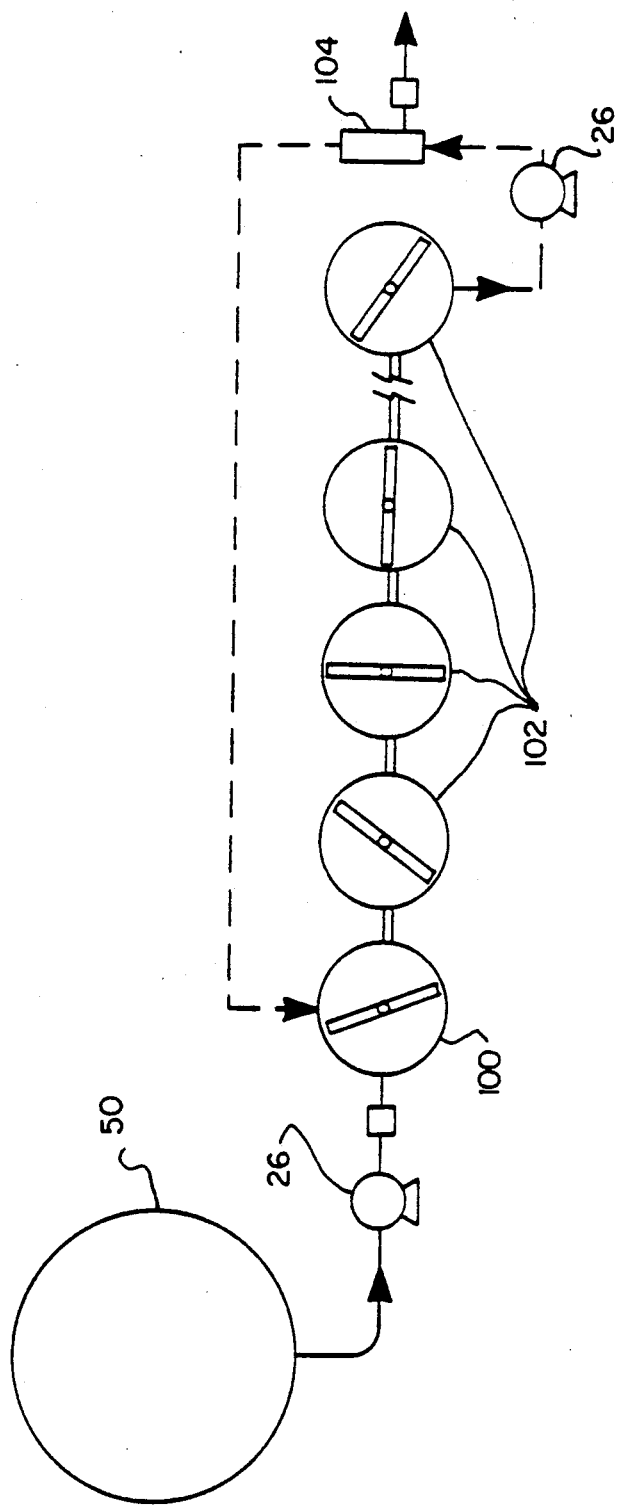
FIG. 16 is a top schematic an extended reactor and module system employing several of the reactors and modules shown in FIG. 15.

FIG. 15 shows a simple photocatalytic decontamination system including a reactor module, defined as two CSTRs 100, 102 and one cross-flow filter (CFF) 104, for an ideal situation wherein the water to be decontaminated is free of poisoning metal ions. In this case the water and slurry flow co-currently since poisoning of the catalyst is not a problem. The purpose of employing two CSTRs in a module is that in a continuous process, fresh contaminated fluid is continuously entering the system at port 105 and, because of the vagaries of fluid flow, a concentrated plume of contaminated fluid could exit in the first CSTR 100 at exit port 106. By using two CSTRs in series, the second reactor 102 acts as a buffer volume for a high concentration spike by providing a second stage of dilution. FIG. 16 is an extension of the ideal case wherein the number of CSTRs has been increased to increase the capacity of the system, but all other features are the same as in FIG. 15.

In a non-ideal situation wherein the water to be decontaminated contains metal ion co-contaminants that may poison the photocatalyst, it is necessary to prevent the migration of those metal ions downstream through the system, in order to achieve optimal photocatalytic oxidation efficiency of the contaminant organics. In this case a different operational strategy must be employed; this strategy involves the use of a pretreatment reactor and counter-current flow of the catalyst and water. The pretreatment reactor substantially removes the metal ion poisons before the water enters the organic oxidation modules, and counter-current flow ensures that any metal ions that slip through do not contaminate the rest of the system. Another benefit of counter-current operation include optimum catalyst activity in the last module before the water leaves the system. The partially deactivated photocatalyst moves "upstream" into the next more highly contaminated reactor wherein the less than optimal activity photocatalyst can still display high efficiency with the higher concentration organic. In this manner the gradually deactivating photocatalyst is pumped upstream. Ultimately, the photocatalyst is pumped into the pretreatment reactor where the catalyst may still have considerable capacity to remove metal ions even though its ability to oxidize organics is substantially diminished.

Figure 17:
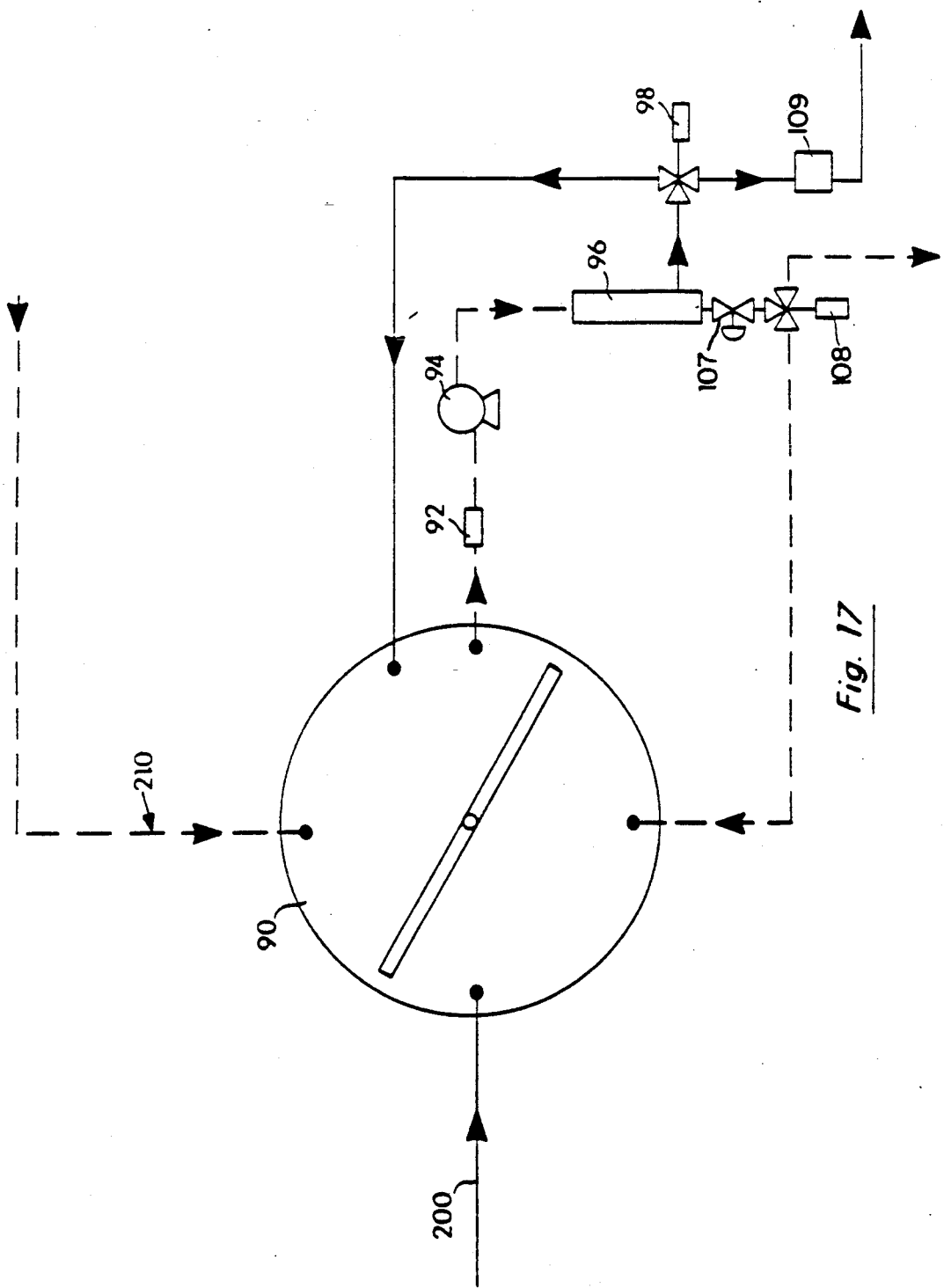
FIG. 17 is a top view schematic of a pretreatment reactor for the removal of metal ions from the contaminated fluid.
Figure 18:
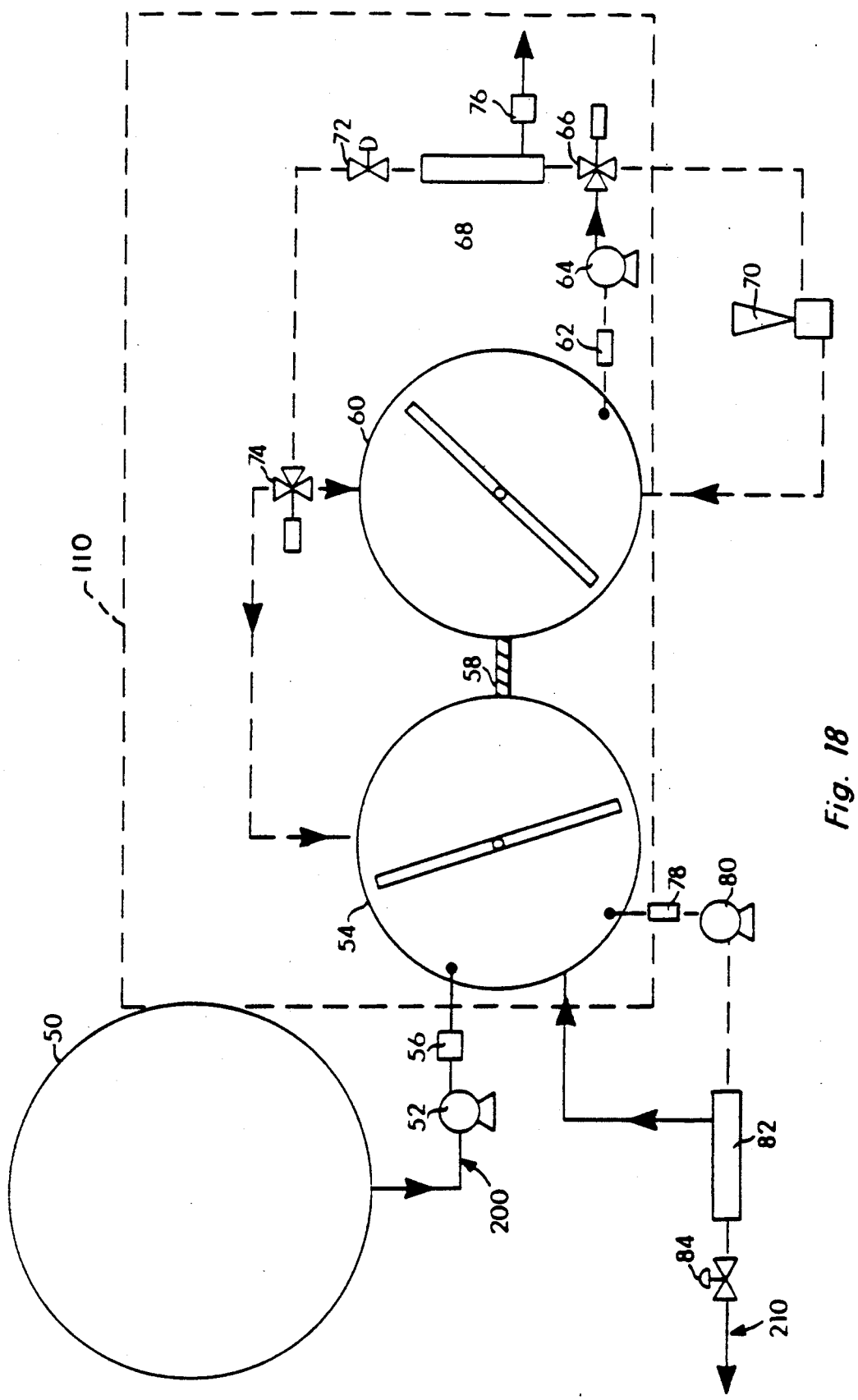
FIG. 18 is a schematic diagram of a two reactor system comprising a module for decontaminating a contaminated fluid by using photocatalytic powder particles in a counter-current mode according to yet another embodiment of the present invention.

Pretreatment reactor CSTR 90 for the removal of metal ions is shown in FIG. 17. Its operation is substantially the same as the CSTRs described above, however its primary purpose is to remove metal ions from the incoming fluid and prevent the metal ions from poisoning the photocatalyst in the subsequent CSTRs. In a counter-current mode, the CSTR 90 will have two influent streams: first a particulates free stream 200 from the contaminated water storage tank 50, and second, a partially decontaminated slurry stream from the first CSTR module 54 via CFF 82 (as shown in FIG. 18). In a manner analogous to the operation of the other CSTRs, the slurry is mixed and illuminated, thus removing the metals by photoelectrodeposition and adsorption. The metals decontaminated water is separated from the photocatalyst by circulation through CFF 96 by pump 94. The filtrate passes through a three-way solenoid valve 98 which directs the filtrate either through metal ion sensor 109 and on to the first CSTR module 54 for organics decontamination, or back to CSTR 90 if the metal ion sensor determines that the pretreatment has not met specification. A ball valve 107 sets the slurry side of CFF 96 back pressure, which determines the filtration rate. A three-way solenoid valve 108 directs the concentrated slurry either back to the CSTR 90 or to a catalyst concentrator/recovery unit (not shown), off line of the main system, when the metals removal capacity of the photocatalyst has been reached.

There is shown in FIG. 18 a system including a pair of CSTRs 54 and 60 and CFFS and 68 and 82 such as described above for decontaminating the organics contaminated water in the counter-current mode. The two CSTRs 54 and 60 and one CFF 68, within the outlined box 110, are the basic counter-current flow modular unit of the system, that can be extended to whatever number of modules necessary for a particular decontamination problem. The CSTRs decontaminate the water progressively wherein the first CSTR 54 may decontaminate the water partially and the second CSTR 60 finishes the decontamination. The FIG. 18 does not include a pretreatment step for removing certain metallic ions from the contaminated fluid. The pretreatment reactor for metal ion removal was discussed above with reference to FIG. 17, the present description assumes that the organics contaminated water is substantially free of interfering metal ions. The overall system includes a storage reservoir 50 in which the contaminated water is initially stored. The contaminated water 200 is pumped from the reservoir 50 by means of a pump 52 to a CSTR 54. A monitor, such as a total organic carbon sensor 56 monitors the degree of contamination of the water entering the CSTR 54. The two CSTRs 54 and 60 are in fluid communication via balance tube 58 which allows the partially decontaminated slurry to flow from CSTR 54 to CSTR 60 as decontaminated water is removed from CSTR 60. Decontaminated slurry is removed from CSTR 60 through pre-filter 62 by pump 64 and pumped through three-way solenoid valve 66, the position of which determines whether the slurry flows to CFF 68 or to the automated catalyst feeder (ACF) 70. Another monitor 76, such as a total organic carbon sensor, samples the clear decontaminated water (filtrate) leaving the CFF 68, and if the decontamination has not reached an acceptable level, then the monitor 76 will cause the pump 64 to shut off for a period of time to allow further decontamination. If the monitor 76 detects an acceptable level of decontamination, then the slurry will be circulated through the CFF 68 for separation of the photocatalyst from the decontaminated water which flows out of the system. The slurry (i.e., retentate) leaving the CFF 68 flows to a ball valve 72, which sets the CFF 68 back pressure, and on to a three-way valve 74, the position of which determines whether the slurry is recirculated back to the CSTR 60 or is directed to CSTR 54. Flow to CSTR 54 effects counter-current flow of the photocatalyst relative to the flow of the progressively cleaner water.

The following sub-systems for photocatalyst ingress and egress are not part of the module but are required for the complete continuous system operating in a counter-current mode. Only one additional CFF 82 would be required for the first reactor for photocatalyst removal and one ACF required on the last reactor for catalyst addition. When fresh catalyst is required to be added to CSTR 60 as determined by monitor 76 which tracks decontamination level as a function of time, three-way valve 66 switches to the position to allow slurry flow to the ACF 70 for the addition of fresh photocatalyst. Three-way valve 66 then switches to direct slurry flow through CFF 68 and three-way valve 74 switches positions to direct slurry flow to CSTR 54 for a period of time, thus moving relatively concentrated slurry (retentate) "up stream". Simultaneously, pump 80 is activated, which pumps slurry from CSTR 54 to CFF 82, the back pressure of which is set by ball valve 84. The relatively concentrated slurry (retentate) 210 is then directed from the ball valve 84 to a catalyst concentrator/recovery unit (not shown); alternatively the slurry may be directed to a metals removal pretreatment reactor (also not shown). The filtrate is directed back to CSTR 54.

Figure 19:
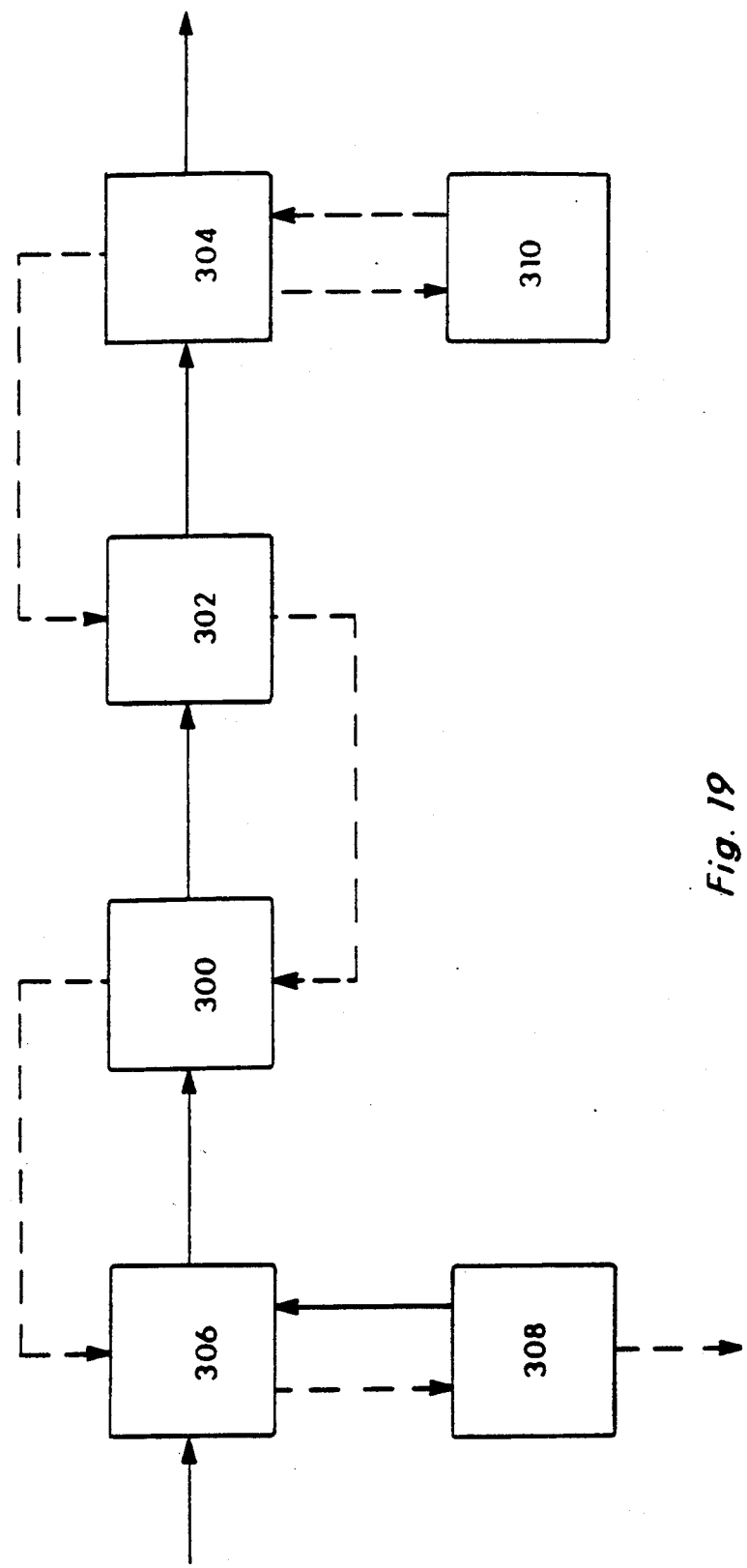
FIG. 19 is a photocatalytic counter-current system including organics oxidation modules and a photocatalytic metal ion removal pretreatment reactor.

FIG. 19 is a block diagram illustrating a complete counter-current system. The reference numerals 300, 302, 304 each represent a module defined as two CSTRs and one CFF; any number of modules may be used in series as required for a particular problem. The reference numeral 306 represents a pretreatment reactor defined as one CSTR and one CFF; the reference numeral 308 represents a photocatalyst concentrator recovery unit where the spent catalyst is removed from the system; and the reference numeral 310 represents a ACF for introducing fresh catalyst to the system. The solid lines indicate photocatalyst free water flows and the lines with cross hatching indicate slurry flows. Contaminated water enters pretreatment reactor 306 where metal ions are removed by photocatalyst that has already seen duty for organics oxidation in the modules 300, 302, 304 and may be partially deactivated towards photocatalysis but still has capacity to remove metal ions. The filtrate from pretreatment number 306 flows to 300 where organics oxidation begins. The filtrate flows to the next module 302, then to the next module 304, and eventually out of the system as pure water. The retentates flow counter-currently from the modules 304, to 302, to 300 and on to the pretreatment reaction 306; eventually the retentate is transferred to the photocatalyst concentrates recovery unit 308 where the spent photocatalyst is removed from the system. The ACF 310 adds fresh photocatalyst as necessary to the last module 304 by mixing the photocatalyst powder into slurry pumped from the last module 304 into the ACF 310 and back to module 304.

Although particular embodiments of the present invention have been described and illustrated herein, it should be recognized that modifications and variations may readily occur to those skilled in the art and that such modifications and variations may be made without departing from the spirit and scope of our invention. Consequently, our invention as claimed below may be practiced otherwise than as specifically described above.

We claim:

1. Apparatus for decontaminating a contaminated fluid by using photocatalytic powder particles comprising:
   a tank holding the contaminated fluid and the photocatalytic powder particles suspended in the contaminated fluid;
   means for maintaining the photocatalytic particles in a suspended state substantially uniformly throughout the fluid;
   a filter through which the fluid passes and through which the photocatalytic powder particles suspended therein are substantially prevented from passing such that the fluid substantially alone passes through said filter;
   means for directing the fluid and the photocatalytic particles suspended therein from said tank to said filter; and
   means for removing the photocatalytic powder particles away from said filter.

2. Apparatus as defined in claim 1 wherein said removing means includes means for changing the direction of fluid flow in the region adjacent to the filter.

3. Apparatus as defined in claim 2 wherein said fluid direction changing means includes means for selectively causing fluid that has passed through said filter to flow back through said filter whereby the photocatalytic powder particles are removed away from said filter.

4. Apparatus as defined in claim 2 wherein said fluid direction changing means includes:
   a conduit through which said fluid directing means causes the fluid and the photocatalytic powder particle suspended therein to pass, said conduit having an inlet and an outlet, said filter being in communication with the interior of said conduit;
   means defining an exit port in communication with the interior of said conduit, the fluid in said conduit passing into said exit port substantially only by passing through said filter;
   a closed cylinder the interior or which is in communication with the interior of said conduit;
   a piston slideably disposed within said cylinder; and
   means for selectively sliding said piston within said cylinder whereby a pressurized pulse of fluid is created within said conduit.

5. Apparatus as defined in claim 4 wherein said fluid direction changing means further includes:
   means for creating a back pressure of fluid within said conduit whereby the fluid pressure within said conduit is higher than the fluid pressure within said exit port; and
   means for selectively prohibiting the low of fluid within said exit port whenever said piston slides within said cylinder to create a pressurized pulse of fluid within said conduit.

6. Apparatus as defined in claim 1 wherein said filter comprises a cross flow filter having a first surface and wherein said fluid directing means directs the fluid and the photocatalytic powder particles suspended therein substantially parallel to a filter surface.

7. A reactor for decontaminating a contaminated fluid by using photocatalytic particles, comprising:
   a shallow tank containing a slurry of contaminated fluid and photocatalytic particles, said slurry having a fluid surface;
   means for illuminating said fluid surface to activate said photocatalytic particles; and
   agitator means at least partially submerged in said slurry for maintaining said photocatalytic particles in a suspended state substantially throughout the slurry, for creating turbulence and aerating the slurry in a photoactive zone extending from the fluid surface to a predetermined depth where the ultraviolet light is effective to activate said photocatalytic particles and decontaminate the fluid.

8. The reactor as defined in claim 7 wherein the illumination means comprises sunlight.

9. The reactor as defined in claim 7 wherein the illumination means comprises artificial light.

10. The reactor as defined in claim 7 wherein the agitator means comprises at least one moveable blade positioned within said zone.

11. Reactor as defined in claim 10 wherein said blade includes means for injecting a gas into the fluid within said tank.

12. Reactor as defined in claim 11 wherein said injecting means injects gas into the fluid substantially along the entire length of said blade.

13. Reactor as defined in claim 11 wherein said injecting means injects gas into the fluid so as to create a force tending to cause said blade to rotate in the fluid.

14. Reactor as defined in claim 10 wherein said blade has a hollow interior and defines a series of ports in fluid communication with said hollow interior and wherein said system further includes means for supplying a gas under pressure to said blade hollow interior whereby the pressurized gas exits said blade through said ports.

15. The reactor as defined in claim 10 wherein the blade comprises a polymeric material.

16. The reactor as defined in claim 10 wherein the blade is a rod possessing a thickness extending in a dimension transverse to the length of the rod, said thickness being between substantially one-fifth and one-half of an inch.

17. The reactor as defined in claim 10 wherein the blade is elongated and pivotably connected for movement within the tank about a pivot point, the blade further having a thickness extending in a dimension transverse to the length of the blade, the thickness of the blade decreasing along its length from the pivot point substantially in proportion to $1/L^x$ where L equals the distance away from the pivot point and where x is a number substantially in the range of from 0 to 2.

18. The reactor as defined in claim 10 wherein said blade is substantially conically shaped.

19. The reactor as defined in claim 10 wherein said blade is diametrically stepped along its length.

20. The reactor as defined in claim 10 wherein the blade is elongated and pivotably connected for movement within the tank about a pivot pint, the blade further being twisted and having a cross section extending in a dimension transverse to the length of the blade, said cross section being substantially rectangular and decreasing along the length of the blade away from the pivot point.

21. The reactor as defined in claim 10 wherein the blade is elongated and pivotably connected for movement within the tank about a pivot point, the blade having a plurality of apertures extending through said blade in a direction substantially parallel to the fluid surface.

22. The reactor as defined in claim 21 wherein the diameter of each aperture is larger than the diameters of apertures located farther away from the pivot point.

23. The reactor as defined in claim 10 wherein said blade is substantially rigid.

24. The reactor as defined in claim 10 wherein said blade is flexible.

25. The reactor as defined in claim 10 wherein the blade is disposed between substantially one millimeter to five millimeters below the fluid surface.

26. The reactor as defined in claim 10 wherein the blade possesses a blade edge which is substantially serrated.

27. The reactor as defined in claim 10 wherein a plurality of discs are spaced radially along said blade, said discs extending substantially orthogonally to the length of said blade.

28. The reactor as defined in claim 10 wherein a series of comb-like fingers depend from said blade.

29. The reactor as defined in claim 28 wherein said agitator means further comprises means for selectively adjusting the orientation of said blade to selectively vary the direction said comb-like fingers depend from said blade.

30. The reactor as defined in claim 10 wherein said blade includes means for injecting a gas into the slurry.

31. The reactor as defined in claim 30 wherein said blade is rotatable about a pivot point and the gas is injected into the slurry creating a force tending to cause said blade to rotate about said pivot point.

32. The reactor as defined in claim 30 wherein said blade has a hollow interior and defines a series of ports in fluid communication with said hollow interior and wherein said system further includes means for supplying a gas under pressure to said blade hollow interior whereby the pressurized gas exits said blade through said ports.

33. The reactor as defined in claim 7 wherein said agitating means includes at least two moveable blades, a first moveable blade disposed substantially near the fluid surface and a second moveable blade disposed below the first moveable blade.

34. The reactor as defined in claim 33 wherein said first moveable blade is at least fifty percent longer than said second moveable blade.

35. The reactor as defined in claim 33 wherein said first and second moveable blades are rotated and second moveable blade is rotated at a speed at least fifty percent faster than the speed at which said first moveable blade is rotated.

36. The reactor as defined in claim 33 wherein said first and second moveable blades are rotated, said first moveable blade rotated in one direction and said second moveable blade rotated in the opposite direction.

37. The reactor as defined in claim 7 wherein said tank is open on one side and wherein the fluid surface is exposed to the open tank side.

38. The reactor as defined in claim 7 wherein the ratio of the area of the fluid surface to the volume of the slurry is in the range of between substantially 1:12 inches to 1:1 inches.

* * * * *